(12) United States Patent
Panwar et al.

(10) Patent No.: US 12,284,227 B1
(45) Date of Patent: Apr. 22, 2025

(54) SCALABLE AUDITABILITY OF MONITORING

(71) Applicant: Arrowhead Center, Inc., Las Cruces, NM (US)

(72) Inventors: Gaurav Panwar, Las Cruces, NM (US); Roopa Vishwanathan, Las Cruces, NM (US); Satyajayant Misra, Las Cruces, NM (US)

(73) Assignee: Arrowhead Center, Inc., Las Cruces, NM (US)

( * ) Notice: Subject to any disclaimer, the term of this patent is extended or adjusted under 35 U.S.C. 154(b) by 0 days.

(21) Appl. No.: 17/721,011

(22) Filed: Apr. 14, 2022

Related U.S. Application Data

(63) Continuation of application No. 17/016,139, filed on Sep. 9, 2020, now Pat. No. 11,323,489.

(Continued)

(51) Int. Cl.
*H04L 9/40* (2022.01)
*H04L 9/32* (2006.01)
*H04L 51/10* (2022.01)

(52) U.S. Cl.
CPC .......... *H04L 63/306* (2013.01); *H04L 9/3221* (2013.01); *H04L 9/3236* (2013.01); *H04L 51/10* (2013.01)

(58) Field of Classification Search
CPC ... H04L 63/306; H04L 9/3221; H04L 9/3236; H04L 51/10

(Continued)

(56) References Cited

U.S. PATENT DOCUMENTS

| 6,963,972 B1 | 11/2005 | Chang et al. |
| 7,508,935 B2 | 3/2009 | Oommen et al. |

(Continued)

FOREIGN PATENT DOCUMENTS

| CN | 107851284 A | * | 3/2018 | ............ G06F 21/10 |
| CN | 108985100 A | * | 12/2018 | ......... G06F 21/6272 |

(Continued)

OTHER PUBLICATIONS

Shi et al., "A Mechanism to Resolve the Unauthorized Access Vulnerability Caused by Permission Delegation in Blockchain-Based Access Control," in IEEE Access, vol. 8, pp. 156027-156042, 2020, doi: 10.1109/ACCESS.2020.3018783. (Year: 2020).*

(Continued)

*Primary Examiner* — Peter C Shaw
(74) *Attorney, Agent, or Firm* — Peacock Law P.C.; Justin R. Jackson; Deborah A. Peacock

(57) ABSTRACT

Secure auditability of monitoring processing using public ledgers that are particularly useful for monitoring surveillance orders, whereby an overseeing enforcer ("E") checks if law enforcement agencies and companies are respectively over-requesting or over-sharing user data beyond what is permitted by the surveillance order, in a privacy-preserving way, such that E does not know the real identities of the users being surveilled, nor does E get to read the users' unencrypted data. Embodiments of the present invention also have inbuilt checks and balances to require unsealing of surveillance orders at the appropriate times, thus enabling accounting of the surveillance operation to verify that lawful procedures were followed, protecting users from government overreach, and helping law enforcement agencies and companies demonstrate that they followed the rule of law.

20 Claims, 5 Drawing Sheets

Related U.S. Application Data

(60) Provisional application No. 62/933,387, filed on Nov. 9, 2019.

(58) Field of Classification Search
USPC ........................................................ 709/224
See application file for complete search history.

(56) References Cited

U.S. PATENT DOCUMENTS

| | | | |
|---|---|---|---|
| 7,596,692 | B2 | 9/2009 | Fox et al. |
| 7,822,204 | B2 | 10/2010 | Yoshida et al. |
| 8,023,695 | B2 | 9/2011 | Rhoads |
| 8,204,224 | B2 | 6/2012 | Xiao et al. |
| 8,855,301 | B2 | 10/2014 | McGrew |
| 9,432,342 | B1 | 8/2016 | Kothari et al. |
| 9,774,578 | B1 | 9/2017 | Ateniese et al. |
| 10,296,248 | B2 | 5/2019 | Ateniese et al. |
| 10,320,569 | B1 | 6/2019 | Wentz et al. |
| 10,425,426 | B1 | 9/2019 | Simons |
| 10,476,665 | B1 | 11/2019 | Griffin et al. |
| 10,601,443 | B1 | 3/2020 | Tourani et al. |
| 10,614,244 | B1* | 4/2020 | Duhaime .............. G06F 21/32 |
| 10,715,507 | B1 | 7/2020 | Spears et al. |
| 10,824,746 | B1* | 11/2020 | Magerkurth .......... G06F 21/602 |
| 11,200,569 | B1* | 12/2021 | James ................. G06Q 20/381 |
| 11,308,487 | B1* | 4/2022 | Foster ............... G06Q 20/3829 |
| 11,323,489 | B1 | 5/2022 | Panwar et al. |
| 11,341,481 | B1* | 5/2022 | Davis .................... G06Q 20/36 |
| 2001/0012365 | A1 | 8/2001 | Gaedke et al. |
| 2002/0130796 | A1 | 9/2002 | Tsuchido et al. |
| 2004/0137921 | A1 | 7/2004 | Valloppillil et al. |
| 2005/0102513 | A1 | 5/2005 | Alve |
| 2006/0059265 | A1 | 3/2006 | Keronen |
| 2010/0310065 | A1 | 12/2010 | Chang et al. |
| 2012/0173664 | A1 | 7/2012 | Kammerer et al. |
| 2013/0135123 | A1 | 5/2013 | Golander et al. |
| 2015/0067055 | A1 | 3/2015 | Khera et al. |
| 2016/0366403 | A1 | 12/2016 | Wang et al. |
| 2017/0063392 | A1 | 3/2017 | Kalevo et al. |
| 2017/0078094 | A1 | 3/2017 | Olson |
| 2017/0171564 | A1 | 6/2017 | Swaminathan et al. |
| 2017/0337534 | A1 | 11/2017 | Goeringer et al. |
| 2017/0357496 | A1* | 12/2017 | Smith ................... H04L 9/0662 |
| 2018/0183601 | A1* | 6/2018 | Campagna ........... G06F 21/602 |
| 2018/0219810 | A1* | 8/2018 | Santos Ramirez .. G06Q 10/107 |
| 2018/0285479 | A1 | 10/2018 | Mackay et al. |
| 2019/0020468 | A1 | 1/2019 | Rosenoer |
| 2019/0103958 | A1* | 4/2019 | Wu ....................... H04L 9/3297 |
| 2019/0103973 | A1* | 4/2019 | Chalkias ............. H04L 63/0442 |
| 2019/0147431 | A1* | 5/2019 | Galebach ................. H04L 9/50 705/44 |
| 2019/0182042 | A1 | 6/2019 | Ebrahimi et al. |
| 2019/0188706 | A1* | 6/2019 | McCurtis ............... G06Q 20/40 |
| 2019/0215565 | A1* | 7/2019 | Webb ................. H04N 21/2347 |
| 2019/0349733 | A1 | 11/2019 | Nolan et al. |
| 2020/0026289 | A1 | 1/2020 | Alvarez et al. |
| 2020/0342427 | A1* | 10/2020 | Kulinna ................ H04L 9/0637 |
| 2021/0049255 | A1 | 2/2021 | Dubeau |
| 2021/0056638 | A1 | 2/2021 | Davis |
| 2021/0374693 | A1 | 12/2021 | La Salle |
| 2021/0382620 | A1 | 12/2021 | Fang et al. |

FOREIGN PATENT DOCUMENTS

| | | | |
|---|---|---|---|
| CN | 110602086 | A | 12/2019 |
| CN | 111079191 | A | 4/2020 |
| CN | 112565223 | A | 3/2021 |
| CN | 112801664 | A * | 5/2021 ........... G06F 21/602 |
| CN | 113193953 | A | 7/2021 |
| CN | 113726520 | A | 11/2021 |
| CN | 114679273 | A | 6/2022 |
| CN | 112671535 | B | 11/2022 |
| CN | 116366320 | A | 6/2023 |
| CN | 116432192 | A | 7/2023 |
| CN | 116996870 | A | 11/2023 |
| EP | 2040453 | | 3/2009 |
| JP | 2007208931 | | 8/2007 |
| JP | 2008028806 | | 2/2008 |
| JP | 4912772 | | 4/2012 |
| WO | 2001029775 | | 4/2001 |
| WO | WO-2016131575 | A1 * | 8/2016 ............. G06F 21/64 |
| WO | 2018020375 | A1 | 2/2018 |
| WO | WO-2018213880 | A1 * | 11/2018 ............. G06F 21/64 |
| WO | 2019009913 | A1 | 1/2019 |
| WO | 2019063256 | A1 | 4/2019 |
| WO | 2019067798 | A1 | 4/2019 |
| WO | 2019086821 | A1 | 5/2019 |
| WO | 2019173519 | A1 | 9/2019 |
| WO | 2020032937 | A1 | 2/2020 |
| WO | WO-2020197990 | A1 * | 10/2020 ............. G06F 21/64 |

OTHER PUBLICATIONS

Rouhani et al., "Physical Access Control Management System Based on Permissioned Blockchain," Halifax, NS, Canada, 2018, pp. 1078-1083, doi: 10.1109/Cybermatics_2018.2018.00198. (Year: 2018).*

Abebe et al., "Verifiable Observation of Permissioned Ledgers," 2021 IEEE International Conference on Blockchain and Cryptocurrency (ICBC), Sydney, Australia, 2021, pp. 1-9, doi: 10.1109/ICBC51069.2021.9461152. (Year: 2021).*

Lei et al., "A Cloud Data Access Authorization Update Scheme Based on Blockchain," 2020 3rd International Conference on Smart BlockChain (SmartBlock), Zhengzhou, China, 2020, pp. 33-38, doi: 10.1109/SmartBlock52591.2020.00014. (Year: 2020).*

Kresman et al., "An Improved Anonymous Identifier," 2022 10th International Symposium on Digital Forensics and Security (ISDFS), Istanbul, Turkey, 2022, pp. 1-5, doi: 10.1109/ISDFS55398.2022.9800823. (Year: 2022).*

Stokkink et al., "A Truly Self-Sovereign Identity System," 2021 IEEE 46th Conference on Local Computer Networks (LCN), Edmonton, AB, Canada, 2021, pp. 1-8, doi: 10.1109/LCN52139.2021.9525011. (Year: 2021).*

Mizrahi et al., "Optimizing Merkle Proof Size for Blockchain Transactions," 2021 International Conference on COMmunication Systems & NETworkS (COMSNETS), Bangalore, India, 2021, pp. 299-307, doi: 10.1109/COMSNETS51098.2021.9352820. (Year: 2021).*

Liu et al., "Merkle Tree: A Fundamental Component of Blockchains," 2021 International Conference on Electronic Information Engineering and Computer Science (EIECS), Changchun, China, 2021, pp. 556-561, doi: 10.1109/EIECS53707.2021.9588047. (Year: 2021).*

Huang et al., "Comparison and Analysis of Data and Transaction Structure of Bitcoin and Ethereum," 2021 2nd International Conference on Computer Communication and Network Security (CCNS), Xining, China, 2021, pp. 108-116, doi: 10.1109/CCNS53852.2021.00029. (Year: 2021).*

Wang et al., "A Trustworthy Data Verification Technique for Cross-Chain Data Sharing Based on Merkle Trees," 2023 International Conference on Distributed Computing and Electrical Circuits and Electronics (ICDCECE), Ballar, India, 2023, pp. 1-6, doi: 10.1109/ICDCECE57866.2023.10150492. (Year: 2023).*

Adhikari et al., "Complete Merkle Hash Trees for Large Dynamic Spatial Data," 2019 International Conference on Computational Science and Computational Intelligence (CSCI), Las Vegas, NV, USA, 2019, pp. 1318-1323, doi: 10.1109/CSCI49370.2019.00246. (Year: 2019).*

Huang et al., "Comparison and Analysis of Data and Transaction Structure of Bitcoin and Ethereum," IEEE, DOI: 10.1109/CCNS53852.2021.00029, WenZhou, China, 2021. (Year: 2021).*

Wang et al., "A Trustworthy Data Verification Technique for Cross-Chain Data Sharing Based on Merkle Trees," IEEE, 979-8-3503-4745-6/23, Jiangsu, China, 2023. (Year: 2023).*

Ahmad, Ashar, et al., "BlockTrail: A Scalable Multichain Solution for Blockchain-based Audit Trails", 2019 IEEE International Conference on Communications (ICC), 2019.

(56) References Cited

OTHER PUBLICATIONS

Bates, Adam, et al., "Accountable wiretapping—or—I know they can hear you now", Journal of Computer Security 23 (2015) DOI 10.3233/JCS-140515 IOS Press, 2015, 167-195.
Black, Paul, et al., "AFES: An Advanced Forensic Evidence System", IEEE doi: 10.1109/EDOCW52865.2021.00034, 2021, 67-74.
Chang, Yanling, et al., "Blockchain in Global Supply Chains and Cross Border Trade: A Critical Synthesis of the State-of-the-Art, Challenges and Opportunities", International Journal of Production Research2020, vol. 58, No. 7, 2082-2099, 2019, 2082-2099.
Fraga-Lamas, Paula, et al., "A Review on Blockchain Technologies for an Advanced and Cyber-Resilient Automotive Industry", IEEE Access Special Section on Advanced Software and Data Engineering for Secure Societies, Digital Object Identifier 10.1109/ACCESS.2019.2895302, vol. 7, 2019, 17578-17598.
Frankle, Jonathan, et al., "Practical Accountability of Secret Processes", 27th USENIX Security Symposium, 2018.
Froomkin, A. Michael, "The Metaphor is the Key: Cryptography, the Clipper Chip, and the Constitution", 143 U. Penn L. Rev. 709 (1995), 1995, 709-775.
Goldwasser, Shafi, et al., "Public Accountability vs. Secret Laws: Can They Coexist?: A Cryptographic Proposal", Proceedings of the 2017 on Workshop on Privacy in the Electronic Society, 2017.
Hingorani, Ishwarlal, et al., "Police Complaint Management System using Blockchain Technology", IEEE, doi: 10.1109/ ICISS49785.2020.9315884, 2020, 1214-1219.
Kamara, Seny, "Restructuring the NSA Metadata Program", International Conference on Financial Cryptography and Data Security, 2014.
Narula, Neha, et al., "zkLedger: Privacy-Preserving Auditing for Distributed Ledgers", 15th USENIX Symposium on Networked Systems Design and Implementation (NSDI '18). Apr. 9-11, 2018 • Renton, WA, USA, 2018.
Radhakrisnnan, Sarav, "Detect threads in encrypted traffic without decryption, using network based security analytics", Cisco Live!, 2018, 1-87.
Ramkumar, Mahalingam, "Executing large-scale processes in a blockchain", Journal of Capital Markets Studies, vol. 2 No. 2,, 2018, 106-120.
Segal, Aaron, et al., "Catching Bandits and Only Bandits: Privacy-Preserving Intersection Warrants for Lawful Surveillance", 4th USENIX Workshop on Free and Open Communications on the Internet, 2014.
Segal, Aaron, et al., "Privacy-Preserving Lawful Contact Chaining: [Preliminary Report]", WPES '16: Proceedings of the 2016 ACM on Workshop on Privacy in the Electronic Society, 2016, 185-188.
Singh, Saurabh Narayan, "A blockchain-based decentralized application for user-driven contribution to Open Government Data", Technische Universitat Munchen Department of Informatics Master's Thesis in Informatics, 2018.
Van Lennep, Christiaan R.E., "A New Layer Of Trust", MA Thesis Philosophy, Politics and Economics, Leiden University, 2018, 1-44.
Zhang, Yiwei, et al., "Research on Government Information Sharing Model Using Blockchain Technology", IEEE, doi: 10.1109/ ITM E .2019.00166, 2019, 726-729.
Zhou, Di, et al., "Application Research of VCR Model Based on AH P in the Design of Government Service Big Data Scenario", IEEE, doi: 10.1109/ICAI BD.2019.8836997, 2019, 66-73.
Zhu, Shuoyi, et al., "Research on the Path of Optimizing China's Digital Government Construction under the Background of Intelligent Society", IEEE, doi: 10.1109/PMIS52742.2021.00072, 2021, 296-299.
Waters, Brent, "Ciphertext-Policy Attribute-Based Encryption: An Expressive, Efficient, and Provably Secure Realization", Public Key Cryptography—PKC, Proceedings, 2011, 53-70.
Wu, C.-P., et al., "Design of integrated multimedia compression and encryption systems", IEEE Transactions on Multimedia, vol. 7, No. 5, 2005, 828-839.
Xie, D., et al., "Enhanced multiple huffman table (mht) encryption scheme using key hopping", Proceedings of the 2004 International Symposium on Circuits and Systems (ISCAS), vol. 5, IEEE, 2004, 568-571.
Yang, Kan, et al., "Attributed-based Access Control for Multi-Authority Systems in Cloud Storage", 2012 32nd IEEE International Conference on Distributed Computing Systems, 2012, 536-545.
Yao, Xuanxia, et al., "A lightweight attribute-based encryption scheme for the Internet of Things", Future Generation Computer Systems, vol. 49, 2015, 104-112.
Yu, Shucheng, et al., "Attribute based data sharing with attribute revocation", Proceedings of the 5th ACM Symposium on Information, Computer and Communications Security ASIACCS, 2010, 261-270.
Zhang, Kai, et al., "A Traceable and Revocable Multiauthority Attribute-Based Encryption Scheme with Fast Access", Security and Communication Networks, vol. 2020, Article ID 6661243, 2020, 1-14.
Zhang, Yinghui, et al., "Attribute-based Encryption for Cloud Computing Access Control: A Survey", ACM Computing Surveys, vol. 53, No. 4, Article 83, 2020, 1-41.
Zhou, J., et al., "Security analysis of multimedia encryption schemes based on multiple huffman table", Signal Processing Letter, vol. 14, No. 3, IEEE, 2007, 201-204.
Goyal, Vipul, et al., "Attribute-based encryption for fine-grained access control of encrypted data", Proceedings of the 13th ACM CCS, 89-98, 2006.
Hong, Jianan, et al., "Comments on "DAC-MACS: Effective Data Access Control for Multiauthority Cloud Storage Systems" /Security Analysis of Attribute Revocation in Multiauthority Data Access Control for Cloud Storage Systems", IEEE Transactions on Information Forensics and Security, vol. 10, No. 6, 2015, 1315-1317.
Huang, Ke, et al., "Achieving Intelligent Trust-Layer for Internet-of-Things via Self-Redactable Blockchain", IEEE Transactions on Industrial Informatics, vol. 16, No. 4, Apr. 2020, 2677-2686.
Huang, Xiaofang, et al., "Multi-Authority Attribute Based Encryption Scheme with Revocation", 2015 24th International Conference on Computer Communication and Networks (ICCCN), Las Vegas, NV, USA, 2015, 1-5.
Huang, Yaodong, et al., "Profit Sharing for Data Producer and Intermediate Parties in Data Trading over Pervasive Edge Computing Environments", IEEE Transactions on Mobile Computing, vol. 22, No. 1, 2023, 429-442.
Huffman, D., et al., "A method for the construction of minimum redundancy codes", proc. IRE, vol. 40, No. 9, 1952, 1098-1101.
Jacobson, V., et al., "Networking named content", Proceedings of the 5th international conference on Emerging networking experiments and technologies, ACM, 2009, 1-12.
Jhuisi, "Charm: A tool for rapid cryptographic prototyping", http://charm-crypto-io, Downloaded Mar. 29, 2022, 2012.
Jiang, Yinhao, et al., "Ciphertext-policy attribute-based encryption against key-delegation abuse in fog computing", Future Generation Computer Systems, vol. 78, 2018, 720-729.
Karchmer, M., et al., "On Span Programs", Proceedings of the Eighth Annual Structure in Complexity Theory Conference, IEEE Computer Society, 1993, 102-111.
Kim, Sam, "Multi-Authority Attribute-Based Encryption from LWE in the OT Model", IACR Cryptol. ePrint Arch., p. 280, 2019, 1-57.
Koponen, T., et al., "A data-oriented (and beyond) network architecture", ACM SIGCOMM Computer Communication Review, vol. 37, ACM, 2007, 181-192.
Kowalczyk, Lucas, et al., "Bilinear Entropy Expansion from the Decisional Linear Assumption", International Association for Cryptologic Research 2015, R. Gennaro and M. Robshaw (Eds.): CRYPTO 2015, Part II, LNCS 9216, 2015, 524-541.
Krawczyk, Hugo, et al., "Chameleon Signatures", Proceedings of the Network and Distributed System Security Symposium, NDSS, 2000.
Kurihara, Jun, "A Consumer-Driven Access Control Approach to Censorship Circumvention in Content-Centric Networking", Pro-

(56) References Cited

OTHER PUBLICATIONS ceedings of the 2016 Conference on 3rd ACM Conference on Information-Centric Networking, Sep. 26, 2016, 186-194.

Lewko, Allison , et al., "Decentralizing Attribute-Based Encryption", Advances in Cryptology—Eurocrypt 2011—30th Annual International Conference on the Theory and Applications of Cryptographic Techniques, Proceedings, ser. Lecture Notes in Computer Science, K. G. Paterson, Ed., vol. 6632, 2011, 568-588.

Lewko, Allison B., et al., "Fully Secure Functional Encryption: Attribute-Based Encryption and (Hierarchical) Inner Product Encryption", Advances in Cryptology—Eurocrypt, Proceedings, 2010, 62-91.

Li, Ming , et al., "Scalable and Secure Sharing of Personal Health Records in Cloud Computing Using Attribute-Based Encryption", IEEE Transactions on Parallel and Distributed Systems, vol. 24, No. 1, 2013, 131-143.

Libert, Benoit , et al., "Scalable Group Signatures with Revocation", Advances in Cryptology—Eurocrypt, Proceedings, 2012, 609-627.

Lin, Huang , et al., "Secure Threshold Multi Authority Attribute Based Encryption without a Central Authority", D.R. Chowdhury, V. Rijmen, and A. Das (Eds.): Indocrypt 2008, LNCS 5365, 2008, 426-436.

Liu, Dongxiao , et al., "Achieving Multi-Authority Access Control with Efficient Attribute Revocation in Smart Grid", IEEE ICC 2014—Communication and Information Systems Security Symposium, 2014, 634-639.

Ma, Hui , et al., "Comments on "Control Cloud Data Access Privilege and Anonymity With Fully Anonymous Attribute-Based Encryption"", IEEE Transactions on Information Forensics and Security, vol. 11, No. 4, 2016, 866-867.

Maji, Hemanta K., et al., "Attribute-Based Signatures", Topics in Cryptology—CT-RSA 2011—The Cryptographers' Track at the RSA Conference 2011, Proceedings, ser. Lecture Notes in Computer Science, A. Kiayias, Ed., vol. 6558, 2011, 376-392.

Maram, Sai Krishna Deepak , et al., "CHURP: Dynamic-Committee Proactive Secret Sharing", Proceedings of the 2019 ACM SIGSAC Conference on Computer and Communications Security, CCS 2019, 2019, 2369-2386.

Massey, J. L., "Guessing and entropy", Proceedings to IEEE International Symposium on Information Theory, IEEE, 1994, 204.

Medium , "Hundreds of Millions of Dollars Locked at Ethereum 0x0 Address and Smart Contracts' Addresses", https://medium.com/@maltabba/hundreds-of-millions-of-dollars-locked-at-ethereum-0x0-address-and-smart-contracts-addresses-how-4144dbe3458a, Downloaded Mar. 29, 22, 2018.

Muscariell, Luca , et al., "Cicn", https://wiki.fd.io/view/Cicn, Downloaded Sep. 24, 2019, 2017.

Okamoto, Tatsuaki , et al., "Decentralized Attribute-Based Encryption and Signatures", IEICE Trans. Fundamentals, vol. E103-A, No. 1, 2020, 41-73.

Panwar, Gaurav , et al., "ReTRACe: Revocable and Traceable Blockchain Rewrites using Attribute-based Cryptosystems", Proceedings of the 26th ACM Symposium on Access Control Models and Technologies, 2021, 103-114.

Patra, Nilkesh , et al., "Data Reduction by Huffman Coding and Encryption by Insertion of Shuffled Cyclic Redundancy Code", Dissertation, Department of Electronics & Communication Engineering; National Institute of Technology, 2007, 1-42.

Pirretti, Matthew , et al., "Secure attribute-based systems", Proceedings of the 13th ACM Conference on Computer and Communications Security, CCS, 2006, 99-112.

Reuters , "Banks complete 25 million euros securities transaction on blockchain platform", https://uk.reuters.com/article/uk-blockchain-securities/banks-complete-25-million-euros-securities-\transaction-on-blockchain-platform-\idUKKCN1GD4DW, Downloaded Mar. 29, 2022, 2018.

Rouselakis, Yannis , et al., "Efficient Statically-Secure Large-Universe Multi-Authority Attribute-Based Encryption", International Financial Cryptography Association 2015, R. Bohme and T. Okamoto (Eds.): FC 2015, LNCS 8975, 2015, 315-332.

Ruan, Xiaoyu , et al., "Using an Innovative Coding Algorithm for Data Encryption", IEEE Transactions, NA, 2006, 1-28.

Rueda, Luis , et al., "A fast and efficient nearly-optimal adaptive Fano coding scheme", Information Sciences, vol. 176, No. 12, 2006, 1656-1683.

Rueda, Luis , et al., "An Efficient Compression Scheme for Data Communication Which Uses a New Family of Self-Organizing Binary Search Trees", International Journal of Communication Systems, vol. 21, No. 10, 2008, 1091-1120.

Sahai, Amit , et al., "Dynamic Credentials and Ciphertext Delegation for Attribute-Based Encryption", Advances in Cryptology—Crypto, Proceedings, 2012, 188-217.

Satyanarayanan, Mahadev , "The Emergence of Edge Computing", Computer, vol. 50, No. 1, 2017, 30-39.

Shannon, C. , "Prediction and entropy of printed english", Bell System technical journal, vol. 30, No. 1, 1951, 50-64.

Smith, G. , "On the foundations of quantitative information flow", Foundation of Software Science and Computational Structures, Springer, 2009, 288-302.

Tan, Syh-Yuan , et al., "Enhancement of a Lightweight Attribute-Based Encryption Scheme for the Internet of Things", IEEE Internet of Things Journal, vol. 6, No. 4, 2019, 6384-6395.

Tateson, Jane , et al., "PSIRP Project, Delverable D4.6: Final Evaluation Report on Deployment Incentives and Business Models", http:/www.psirp.org/publications/, Downloaded Sep. 28, 2017, 2010.

Thyagarajan, Sri Aravinda Krishnan, et al., "Reparo: Publicly Verifiable Layer to Repair Blockchains", CoRR abs/2001.00486, http://arxiv.org/abs/2001.00486, Downloaded Mar. 29, 2022, 2020.

Tomida, Junichi , et al., "Fast, compact, and expressive attribute-based encryption", IACR International Conference on Public-Key Cryptopgraphy, Springer, 2020, 3-33.

Tourani, Reza , et al., "Democratizing the Edge: A Pervasive Edge Computing Framework", arXiv:2007.00641v1, 2020, 1-7.

Vassantlal, Robin , et al., "COBRA: Dynamic Proactive Secret Sharing for Confidential BFT Services", 2022 IEEE Symposium on Security and Privacy (SP), 2022, 1335-1353.

Vitter, Jeffrey Scott, "Design and Analysis of Dynamic Huffman Codes", Journal of the Association for Computing Machinery; vol. 34. No. 4, Oct. 1987, 825-845.

Wachs, Matthias , et al., "On the Feasibility of a Censorship Resistant Decentralized Name System", Foundations and Practice of Security; Cham, 2014, 19-30.

Wang, Zhedong , et al., "FE for Inner Products and Its Application to Decentralized ABE", International Association for Cryptologic Research 2019, D. Lin and K. Sako (Eds.): PKC 2019, LNCS 11443, 2019, 97-127.

Wang, Minqian , et al., "Security analysis of a privacy-preserving decentralized ciphertext-policy attribute-based encryption scheme", Concurrency Computat.: Pract. Exper., vol. 28, 2016, 1237-1245.

"Pursuit Project", http://www.fp7-pursuit.eu, Downloaded Sep. 24, 2019, 2017.

"Tor Project", http://www.torproject.org/, Downloaded Sep. 24, 2019, 2017.

Abe, Masayuki , et al., "Design in Type-I, Run in Type-III: Fast and Scalable Bilinear-Type Conversion Using Integer Programming", International Association for Cryptologic Research 2016, M. Robshaw and J. Katz (Eds.): Crypto 2016, Part III, LNCS 9816, 2016, 387-415.

Acs, G. , et al., "Cache privacy in named-data networking", International Conference on Distributed Computer Systems (ICDCS), IEEE, 2013, 41-51.

Agrawal, Shashank , et al., "FAME: Fast Attribute-Based Message Encryption", Proceedings of the 2017 ACM SIGSAC Conference on Computer and Communications Security, CCS, 2017, 665-682.

Akinyele, Joseph A., et al., "Charm: a framework for rapidly prototyping cryptosystems", J Cryptogr Eng, vol. 3, 2013, 111-128.

Arianfar, S. , et al., "On preserving privacy in content-oriented networks", Proceedings of the ACM SIGCOMM workshop on Information-centric networking, ACM, 2011, 19-24.

Ateniese, Giuseppe , et al., "Redactable blockchain-or-rewriting history in bitcoin and friends", 2017 IEEE European Symposium on Security and Privacty (EuroS&P), IEEE, 2017, 111-126.

(56) References Cited

OTHER PUBLICATIONS

Attrapadung, Nuttapong, et al., "Attribute=Based Encryption Supporting Direct/Indirect Revocation Modes", 12th IMA International Conference, Cryptography and Coding, Proceedings, 2009, 278-300.

Bahl, Paramvir (Victor), et al., "Pervasive Computing at the Edge", IEEE Pervasive Comput., vol. 19, No. 4, 2020, 8-9.

Bellare, Mihir, et al., "Foundations of Group Signatures: Formal Definitions, Simplified Requirements, and a Construction Based on General Assumptions", Advances in Cryptology—Eurocrypt Proceedings, 2003, 614-629.

Bellare, Mihir, et al., "Foundations of Group Signatures: The Case of Dynamic Groups", Topics in Cryptology—CT-RSA, Proceedings, 2005, 136-153.

Bentov, Iddo, et al., "Tesseract: Real-Time Cryptocurrency Exchange Using Trusted Hardware", Proceedings of the 2019 ACM SIGSAC Conference on Computer and Communications Security, CCS, 2019, 1521-1538.

Bethencourt, John, et al., "Ciphertext-Policy Attribute-Based Encryption", 2007 IEEE Symposium on Security and Privacy (S&P 2007), 2007, 321-334.

Bethencourt, John, et al., "New Constructions and Practical Applications for Private Stream Searching (Extended Abstract)", Proceedings of the 2006 IEEE Symposium on Security and Privacy (S&P'06), 2006, 132-139.

Boldyreva, Alexandra, et al., "Identity-based encryption with efficient revocation", Proceedings of the 2008 ACM CCS, 2008, 417-426.

Boneh, Dan, et al., "Short Group Signatures", M. Franklin (Ed.): Crypto 2004, LNCS 3152, International Association for Cryptologic Research 2004, 2004, 41-55.

Bootle, Jonathan, et al., "Foundations of Fully Dynamic Group Signatures", IACR Cryptol. ePrint Arch, http://eprint.iacr.org/2016/368, Downloaded Mar. 29, 2022, 2016, 368.

Bowe, Sean, et al., "A Multi-party Protocol for Constructing the Public Parameters of the Pinocchio zk-SNARK", International Financial Cryptography Association 2019, A. Zohar et al. (Eds.): FC 2018 Workshops, LNCS 10958, 2019, 64-77.

Business Insider, "The growing list of applications and use cases of blockchain technology in business and life", https://www.businessinsider.com/blockchain-technology-applications-use-cases, Downloaded Mar. 29, 2022, 2020.

Business Wire, "Accenture Editable Blockchain", https://www.businesswire.com/news/home/20160920005551/en/Accenture-Debuts-Prototype-of-%E2%80%98Editable%E2%80%99-Blockchain-for-Enterprise-and-Permissioned-Systems, Downloaded Mar. 29, 22, 2016.

California Gov, "California Consumer Privacy Act", https://oag.ca.gov/privacy/ccpa, Downloaded Mar. 29, 2022, 2018.

Camenisch, Jan, et al., "Chameleon-Hashes with Ephemeral Trapdoors—And Applications to Invisible Sanitizable Signatures", Public-Key Cryptography—PKC, Proceedings, Part II, 2017, 152-182.

Chaabane, A., et al., "Privacy in content-oriented networking: Threats and countermeasures", ACM SIGCOMM Computer Communication Review, vol. 43, No. 3, 2013, 25-33.

Chase, Melissa, et al., "Improving Privacy and Security in Multi-Authority Attribute-Based Encryption", Proceedings of the 2009 ACM Conference on Computer and Communications Security, CCS 2009, 2009, 121-130.

Chase, Melissa, "Multi-authority Attribute Based Encryption", Theory of Cryptography, 4th Theory of Cryptography Conference, TCC, Proceedings, Salil P. Vadhan (Ed.), 2007, 515-534.

Chen, Jianwei, et al., "Efficient Decentralized Attribute-based Access Control for Cloud Storage with User Revocation", IEEE ICC 2014—Selected Areas in Communications Symposium, 2014, 3782-3787.

Chen, Jie, et al., "Improved Dual System ABE in Prime-Order Groups via Predicate Encodings", International Association for Cryptologic Research 2015, E. Oswald and M. Fischlin (Eds.): Eurocrypt 2015, Part II, LNCS 9057, 2015, 595-624.

Chow, Sherman S.M., "A framework of Multi-Authority Attribute-Based Encryption with Outsourcing and Revocation", Proceedings of the 21st ACM on Symposium on Access Control Models and Technologies, SACMAT, 2016, 215-226.

Clarisse, Remi, et al., "Curves with Fast Computations in the First Pairing Group", Springer Nature Switzerland AG 2020, S. Krenn et al. (Eds.): CANS 2020, LNCS 12579, 2020, 280-298.

Connolly, Christopher, et al., "TRIST: Circumventing Censorship with Transcoding-Resistant Image Steganography", FOCI, 2014, 1-8.

Cui, Hui, et al., "Server-Aided Revocable Attribute-Based Encryption", Computer Security—ESORICS, Proccedings, Part II, 2016, 570-587.

Dannewitz, C., et al., "NetInf: An information-centric design for the future Internet", GI/ITG KuVS Workshop on The Future Internet, 2009.

Datta, Pratish, et al., "Decentralized Multi-authority ABE for DNFs from LWE", Advances in Cryptology—Eurocrypt 2021—40th Annual International Conference on the Theory and Applications of Cryptographic Techniques, Proceedings, Part I, ser. Lecture Notes in Computer Science, A. Canteaut and F. Standaert, Eds., vol. 12696, 2021, 177-209.

Datta, Pratish, et al., "Fully Secure Unbounded Revocable Attribute-Based Encryption in Prime Order Bilinear Groups via Subset Difference Method", IACR Cryptology ePrint Archive, http://eprint.iacr.org/2015/293, Downloaded Mar. 29, 2022, 2015.

Department of Homeland Security, "Blockchain and Suitability for Goverment Applications", https://www.dhs.gov/sites/default/files/publications/2018_AEP_Blockchain_and_Suitablity_for_Government_Applciations.pdf, Downloaded Mar. 29, 2022, 2018.

Derler, David, et al., "Fine-Grained and Controlled Rewriting in Blockchains: Chameleon-Hashing Gone Attribute-Based", 26th Annual Network and Distributed System Security Symposium, NDSS, 2019.

Deuber, Dominic, et al., "Redactable Bockchain in the Permissionless Setting", IEEE Symposium on Security and Privacy, SP 2019, San Francisco, CA., May 19-23, 2019, 124-138, 2019.

Dibenedetto, S., et al., "Andana: Anonymous named data networking application", Arxiv preprint arXiv:1112.2205, 2011.

Dorrie, H., 100 Great problems of elementary mathematics, Dover Publications, 1965, 23-25.

Dougherty, Sean, et al., "Apecs: A Distributed Access Control Framework for Pervasive Edge Computing Services", ACM SIGSAC Conference on Computer and Communications Security, 2021, 1405-1420.

Escala, Alex, et al., "An Algebraic Framework for Diffie-Hellman Assumptions", J Cryptol, vol. 30, 2017, 242-288.

Fan, Yundong, et al., "Multi-authority attribute-based encryption access control scheme with hidden policy and constant length ciphertext for cloud storage", In Second IEEE International Conference on Data Science in Cyberspace, DSC 2017, Shenzhen, China, Jun. 26-29, 2017. IEEE Computer Society, 2017, 205-212.

Feng, Chaosheng, et al., "Attribute-Based Encryption With Parallel Outsourced Decryption for Edge Intelligent IoV", IEEE Transactions on Vehicular Technology, vol. 69, No. 11, 2020, 13784-13795.

Fraenkel, A. S., et al., "Complexity aspects of guessing prefix codes", Algorithmica, vol. 12, Nos. 4-5, 1994, 409-419 (only 409-410 available).

Fujisaki, Eiichiro, et al., "Secure Integration of Asymmetric and Symmetric Encryption Schemes", Advances in Cryptology—Crypto, Proceedings, 1999, 537-554.

Galbraith, Steven D., et al., "Pairings for cryptographers", Discrete Applied Mathematics, vol. 156, 2008, 3113-3121.

Ge, Chunpeng, et al., "Revocable Attribute-Based Encryption With Data Integrity in Clouds", IEEE Transactions on Dependable and Secure Computing, vol. 19, No. 5, 2022, 2864-2872.

Ge, Aijun, et al., "Security Analysis of a Privacy-Preserving Decentralized Key-Policy Attribute-Based Encryption Scheme", IEEE Transactions on Parallel and Distributed Systems, vol. 24, No. 11, 2013, 2319-2321.

(56) References Cited

OTHER PUBLICATIONS

Gillman, D., et al., "On breaking a huffman code", IEEE Transactions on Information Theory, vol. 2, No. 3, 1996, 972-976.

* cited by examiner

SCALABLE AUDITABILITY OF MONITORING

CROSS-REFERENCE TO RELATED APPLICATIONS

This application is a continuation application of U.S. patent Application Ser. No. 17/016,139 entitled Scalable Auditability of Monitoring Process Using Public Ledgers", filed on Sep. 9, 2020, which itself claims priority to and the benefit of the filing of U.S. Provisional Patent Application No. 62/933,387, entitled "Scalable Auditability of Monitoring Processes Using Public Ledgers", filed on Nov. 9, 2020, and the specifications, including the appendix, and any claims thereof are incorporated herein by reference.

STATEMENT REGARDING FEDERALLY SPONSORED RESEARCH OR DEVELOPMENT

This invention was made with government support under grant US National Science Foundation Grant Nos. 1719342, 1345232, 1914635, and 2028797, EPSCoR Cooperative agreement OIA-1757207, 1800088; and Intel grant #34627535. The government has certain rights in the invention.

BACKGROUND OF THE INVENTION

With increases in connected devices and electronic communications becoming the mainstay of human interactions, monitoring of human electronic activities have become pervasive both by companies trying to use the information for business advantage and governments trying to surveil citizens for national security and criminal activities. Organized surveillance, particularly by state actors poses a serious challenge to an individual's privacy on account of the resources at its disposal and its potential for overreaching use. Further, individual or representative entities do not have a mechanism to audit the surveillance, even after its completion, to assess if their rights were violated.

To motivate the discussion, we use the well-known United States Surveillance law, namely Electronic Communications Privacy Act ("ECPA"), it's amendments, and its corresponding processes as an example. Similar laws exist in other countries, e.g., the Investigatory Powers Act in the UK, and the Telecommunications (Interception and Access) Act in Australia. Several studies have shown that said processes, although technically auditable, tend to be opaque and seldom fully auditable, even when the audit is performed by powerful oversight bodies, such as the US Congress.

In these monitoring processes, the active players include the law enforcement/intelligence gathering agency (L) that makes the surveillance request; the judge/court (J) that grants the requests; and the company (C) that provides the data corresponding to the request. The other actors include the individual (I) being surveilled and other users/agencies, e.g., American Civil Liberties Union ("ACLU") whose mission is to defend and safeguard individual privacy rights. The steps in the process generally start with the agency L requesting a court order from the judge J. If J approves the request, she creates a sealed court order, which can only be unsealed by L for the company C; the sealed order can be unsealed for the public after a pre-defined time (set during the issue of the order). The company C either accepts the request and provides the data or challenges the order on perceived violations. Once all parties agree, C sends the data requested. The agency L and company C can iteratively request and transmit data respectively several times, as needed, within the purview of the order.

Challenges and Motivation: The said monitoring processes present several issues that hinder accountability and public auditability, that are desirable for transparency: 1) The fact that there exists a sealed order is not publicly notified. 2) Further, as per previous studies, there is no systematic mechanism to unseal orders. In the absence of information, there is no way for the public to even know if there is any order, let alone request its unsealing when the sealing date expires. Note that an order not getting unsealed might not necessarily mean the judge issuing the order is malicious, rather, the judge might simply forget to unseal the order at the right time. 3) An important missing piece in all accountability mechanisms today is that there is no way to make sure that exchanges happening between L and C, at the time of the surveillance, followed the letter and spirit of the sealed order (enabling an auditable trail). 4) The scalability of the processes given the number of requests (around 16K to 33K, as discussed below) and the frequency of exchanges between/among the parties has not been explored.

Currently the only information that is publicly available is summarized information from the courts themselves or from annual aggregate reporting by companies. For instance, the Foreign Intelligence Surveillance Act (FISA) court rulings present the number of requests made under different sections, the number fully or partially granted, and the number denied. For example, in 2018, 1204 requests were submitted for Sections U.S.C. 50 § 1805 and § 1804, with 868 granted, 308 modified, 41 partly denied, and 18 completely denied. However, this information usually tends to be high level aggregate statistics and is not useful for public accountability. It does not equip individuals being surveilled with the means to determine if any of the players involved (law enforcement agencies, companies) reached beyond the ambit of the court's order, or if they were unfairly surveilled—for example ("e.g.") wholesale or dragnet surveillance.

As a result, the exchanges and dealings between governments conducting surveillance, citizens being surveilled, and non-profit privacy advocates and organizations, are uneasy at best, and pugnacious at worst. This is evidenced in the steady stream of lawsuits challenging the constitutionality of various government surveillance programs, raising pertinent questions about the legality and ethics of the surveillance itself, and if citizens' privacy and constitutional rights were violated.

Google's transparency report states the number of user data and account requests made over a six-month period and the proportion of requests under each category (for example subpoenas and search warrants). Notable is the fact that the number of requests to Google have been rising steadily for the last five years, e.g., in the US, 16,407 user data requests for roughly 31,072 user accounts for year 2012, to 32,877 user data requests corresponding to roughly 68,456 user accounts in 2017.

For the first months of 2018 (the last reported data), there were 20,936 user requests for approximately 62,142 user accounts. Similar reports are also available from other companies, such as Microsoft and Facebook. According to our findings, frequently, the information presented is scarce and there are neither well-defined mechanisms to audit surveillance processes from the outset, nor to enable the surveilled individual the capability to assess post-completion of the surveillance whether the search violated their privacy rights, e.g., the right of citizens to be secure against unreasonable searches and seizures, per the US Constitution's Fourth Amendment.

Organized surveillance, especially by governments poses a major challenge to individual privacy, due to the resources that governments have at their disposal, and the possibility of overreach. Given the impact of invasive monitoring, in most democratic countries, government surveillance is, in theory, monitored and subject to public oversight to guard against violations. In practice, there is a difficult fine balance between safeguarding an individual's privacy rights and not diluting the efficacy of national security investigations, as exemplified by reports on government surveillance programs that have caused public controversy, and have been challenged by civil and privacy rights organizations.

Surveillance is generally conducted through a mechanism where federal agencies obtain a warrant from a federal or state judge (e.g., the US FISA court, Supreme Court in Canada) to subpoena a company or service-provider (e.g., Google, Microsoft) for their customers' data. The courts provide annual statistics on the re-quests (accepted, rejected), while the companies provide annual transparency reports for public auditing. However, in practice, the statistical information provided by the courts and companies is at a very high level, generic, is released after-the-fact, and is inadequate for auditing the operations. Often this is attributed to the lack of scalable mechanisms for reporting and transparent auditing.

Embodiments of the present invention relate to scalable auditability of monitoring processes using public ledgers. Thus, embodiments of the present invention are hereinafter occasionally referred to as "SAMPL". Embodiments of the present invention provide a novel auditing framework that leverages cryptographic mechanisms, including but not limited to zero knowledge proofs, Pedersen commitments, Merkle trees, and public ledgers to create a scalable mechanism for auditing electronic surveillance processes involving multiple actors. SAMPL is the first framework that can identify the actors (e.g., agencies and companies) that violate the purview of the court orders. Embodiments of the present invention can be scaled for handling concurrent monitoring processes without undermining their secrecy and auditability.

Known systems require law enforcement agencies and companies to post cryptographic commitments and ZKPs to the blockchain at regular intervals. Moreover, honest parties are trusted to log information regularly and are expected to report dishonest logging whenever they see it. There are two significant problems with such an approach: firstly, government agencies and companies might be forgetful, and cannot be trusted to post information regularly to a public ledger. Secondly, companies might be loath to report possibly dishonest logging by law enforcement agencies when they see it, fearing retribution.

There is thus a present need for a system which removes such requirements by introducing an independent auditor who can keep both the company and the law enforcement agency in check. Still further, in known systems, ZKPs created by an agency and/or company were basically used as a proof that they are aware of the court's surveillance order. A ZKP is a proof of knowledge, not compliance; merely proving knowledge of the contents of a court's orders does not guarantee that the agency/company are complying with the court's orders. There is thus also a present need for a system wherein the Enforcer explicitly verifies that the data requested by the law enforcement agency, and given by the company, are within the ambit of the court's surveillance order. This is preferably done in a privacy-preserving manner such that the Enforcer does not actually get to know the user's data (e.g., emails), but is able to verify that the agency is not over-requesting data, and the company is not over-sharing data.

BRIEF SUMMARY OF EMBODIMENTS OF THE PRESENT INVENTION

Embodiments of the present invention relate to a method for ensuring compliance and public accountability between parties of a confidential transaction including entering an encrypted confidential order into a public ledger, a requesting party issuing a request for data of a first party, an enforcer reviewing the request for data and if the request for data is within a scope of the encrypted confidential order, the enforcer forwarding the request for data to a second party, the second party providing encrypted data of the first party in response to the request for data, and the enforcer reviewing the encrypted data, without decrypting the encrypted data, and forwarding the encrypted data to the requesting party if the encrypted data does not exceed the scope of the confidential order and/or a scope of the request for data.

The second party providing encrypted data of the first party can include encrypting data of the first party and storing the encrypted data on non-transitory computer readable media by the second party. Optionally, issuing a request for data can include issuing a request for data that comprises emails. The emails can be grouped and encrypted into batches of emails. The confidential order can include a surveillance order. In the method, a judge can cause the encrypted confidential order to be entered into the public ledger. The enforcer can enter information into the public ledger when the requesting party requests data beyond the scope of the confidential order. The enforcer can enter information into the public ledger when the providing party provides data beyond the scope of the confidential order and/or beyond the scope of the request for data.

The method can also include the second party providing the requesting party with a key for decrypting the encrypted data. Optionally, the confidential order can include a search order in accordance with a national security letter, which search order can be posted to the public ledger by the requesting party. The search order can include a request for confidential information. Optionally, issuing a request for data can include issuing a request for data that comprises one or more IP addresses. Issuing a request for data can include issuing a request for data that includes searchable encryptions.

Embodiments of the preset invention also relate to a method for storing data of a first party on non-transitory computer readable media of a second party, the method including creating an alias identity for a first party, creating a pseudonymous identity for a first party, establishing an encryption key between the first party and the second party corresponding to the alias identity, establishing an encryption key between the first party and the second party corresponding to the pseudonymous identity for the first party, establishing a zero-knowledge proof ("ZKP") for the data of the first party, and encrypting and storing the data on the non-transitory computer readable media of the second party. The data can include emails and the emails can optionally be grouped together in batches that are then encrypted. A Merkle hash tree can be created for each of the batches with hashes of the emails at the leaves. The method can also include the first party verifying and signing a root of the Merkel hash tree. In the method, the first party can provide the second party with keys and associated ZKPs for the alias identity and the pseudonymous identity. The first party can also provide the second party with signed copies of ZKPs and public verification metadata. The associated ZKPs can be Chaum-Pedersen-style interactive ZKPs. The ZKPs can be made non-interactive by applying a Fiat-Shamir transform to the Chaum-Pedersen-style interactive ZKPs.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
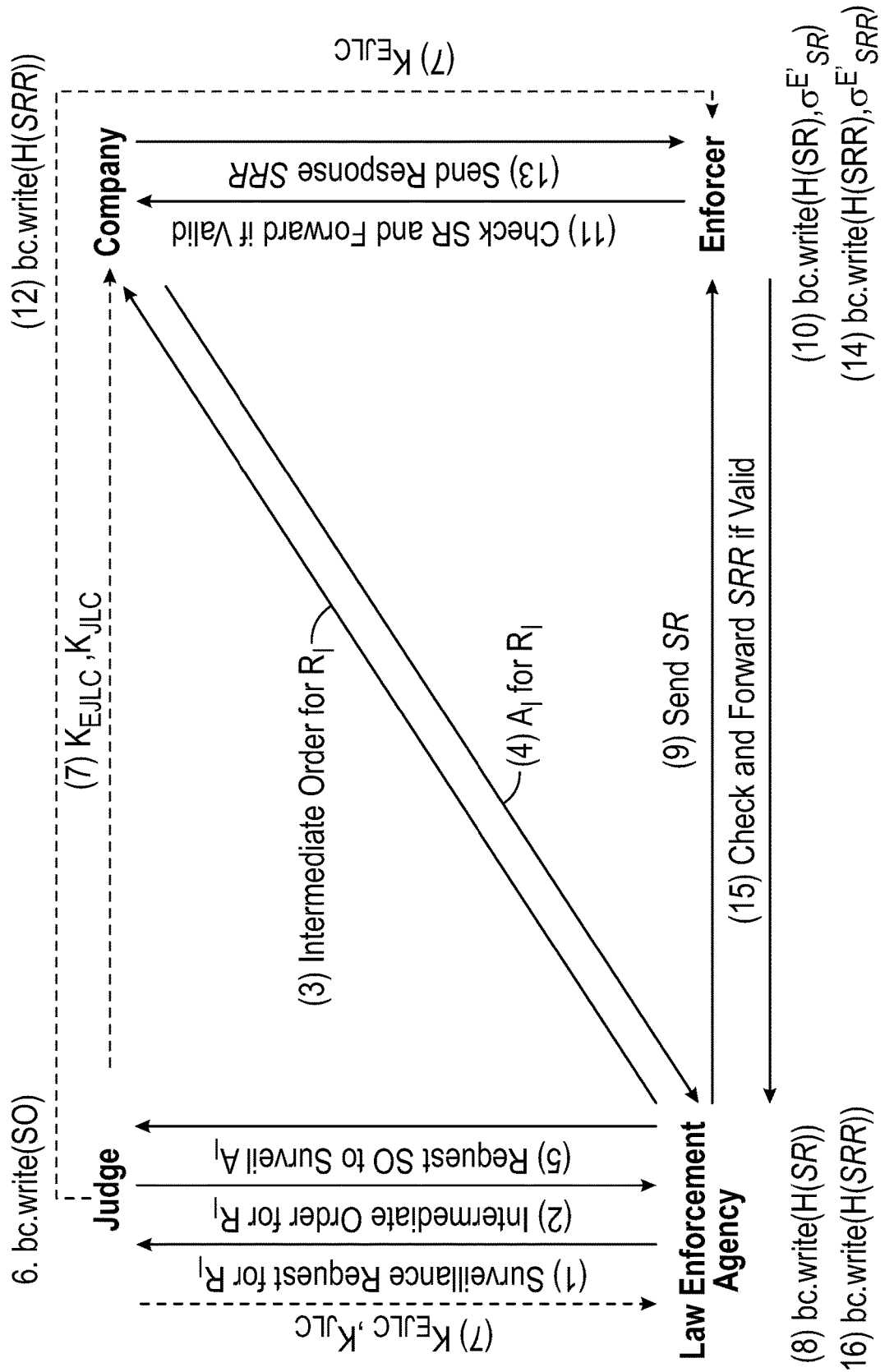
FIG. 1 is a diagram which illustrates workflow according to an embodiment of the present invention wherein dashed lines represent key exchange and solid lines represent regular communication.

Embodiments of the present invention address the challenges described in the Background section above. Some of the unique aspects of embodiments of the present invention include i) a generic and scalable framework for accountability of monitoring processes; ii) a capability to audit the compliance of the entities over the lifetime of the surveillance order from the outset, using cryptographic techniques such as ZKPs, and Pedersen commitments. An entity, referred to herein as an "Enforcer", preferably serves as the conduit for interactions between law enforcement/intelligence gathering agencies and companies, and verifies their interactions to guarantee compliance. Embodiments of the present invention qualitatively prove that auditability of the surveillance process when the court order is active is possible if an entity such as an Enforcer serves as the conduit for information and the process does not leak information about the surveillance to the public-only provides audit insights. iii) A case study of SAMPL in the context of the US legal system. iv) Security analysis of the framework of SAMPL. v) Validation of the framework using a near-real world implementation to assess scalability. As used throughout this application, the term "public ledger" is intended to include a blockchain as well as any public messaging system that preserves anonymity and provides provenance.

In an embodiment of the present invention, there are preferably six parties the individual being surveilled "I", company "C" that/has an account (e.g., e-mail) with, law enforcement and/or intelligence gathering agency "L" requesting the surveillance, Judge "J" who can potentially issue the surveillance order on I, and an Enforcer "E", who enforces accountability of L and C's operations, by ensuring that L does not request more information about/than what is authorized by J, and C does not over-share information about I, more than what is authorized by J. Finally, embodiments of the present invention have a set of interested users, "U", which can be made up of civil-rights and/or non-profit organizations (e.g., American Civil Liberties Union (ACLU)) whose mission is to protect and preserve individuals' privacy as defined by laws. We assume that all communication between J, L, C, E, I, and U takes place via secure and authenticated channels. They use each other's public and verification keys, respectively to encrypt and authenticate all communication between them.

In one non-limiting example of a user-company interaction with an embodiment of the present invention, a user preferably signs up with the company, creates signing keys for a real identity ("RI"), an anonymous identity ("AI") and an initial pseudonymous identity ("PI"). The RI and AI of user preferably remain static while a new PI can be generated on demand or in a periodic manner. The RI can be used to sign AI, thus, with the signature, it can be proved that AI belongs to user identified by RI. Each PI is preferably signed with the user's AI, this proves PI belongs to a user with AI without revealing user's RI to verifier. The user data is preferably batched and hashes of individual pieces of data are preferably used to form Merkle trees. The roots of Merkle trees are signed by user's current PI.

A few of the many benefits provided by embodiments of the present invention include:
1) The public can routinely check the ledger for activity of parties involved in ongoing and past surveillances;
2) On expiration of a specific surveillance order a judge can be approached to provide the keys and verify that the surveillance carried out was not unlawful; and
3) Certain govt organizations, for example the Office of Inspector General, can verify surveillance orders even before the expiration of a surveillance order to keep all involved parties in check.

Embodiments of the present invention can include every combination of features that are disclosed herein independently from each other.

In one exemplary embodiment as illustrated in FIG. 1, a judge, company and agency interact to establish the parameters of current surveillance, including the RI and AI of user (See FIG. 1: Steps 1-5). The judge signs the surveillance order and posts it on ledger in three parts (see FIG. 1: Steps 6-7):

Part 1: Contains sensitive and revealing information, for example the reason for the surveillance, RI of users, etc., which is preferably encrypted with keys only available to J, L and C.

Part 2: Contains sensitive but non-revealing information, for example the surveillance period, AI of users, etc., which is preferably encrypted with keys only available to J, L, C and E.

Part 3: Contains publicly available information, for example, the expiry date of the surveillance order, etc., which is preferably unencrypted.

L then preferably requests information from C through E (see FIG. 1: Steps 8-11); C sends requested data to E, who checks Part 2 of the surveillance order and verifies that the data is appropriate according to the surveillance order and that C is not oversharing (see FIG. 1: Steps 12-14); and E then forwards verified data to L (see FIG. 1: Steps 15-16).

TABLE 1

| Variable | Definition |
|---|---|
| $\lambda$ | Security parameter |
| J, L, C, E, I, U, I | Judge, Law enforcement agency, Company, Enforcers Set, Individual, Set of Users, Set of Individuals |
| $\sigma$ | Signature |
| T | T's total data records |
| $RI = (VK_{RI}, SK_{RI})$ | Real identity of individual I |
| $AI = (VK_{AI}, SK_{AI})$ | Anonymized identity of individual I |
| $PI = (VK_{PI_1}, SK_{PI_1}), \ldots, (VK_{PI_m}, SK_{PI_m})$ | Pseudonymous identities of individual I |
| $K_{CI}$ | Key shared between company C and individual I |
| $K_{JLC}$ | Key shared between J, L, C |
| $K_{EJLC}$ | Key shared between E, J, L, C |
| C | Ciphertext |
| bSize | Batch Size for a client |
| bNum | Batch number for a specific client message |
| $TT_{PI_i}$ | ZKP that $PI_i$ valid pseudonym of individual I |
| SO | Surveillance order |
| IO | Intermediate order |
| l | time period for surveillance |
| Verify( ) | Verification function |
| ZKPVerify( ) | ZKP Verification function |
| Jdecide( ) | Judge decision function |
| Ldecide( ) | Law enforcement agency decision function |
| Cdecide( ) | Company decision function |
| OrderGen( ) | Judge order generating function |
| SR | Law enforcement agency's surveillance request |
| SRR | Company's surveillance request response |
| \|\| | Concatenation operator |
| BC( ) | Blockchain |
| BC.read( ) | Blockchain read function |
| BC.wnte( ) | Blockchain write function |

A table of notations is given in Table 1. Note that $I \subset \mathbb{I}$, where $\mathbb{I}$ is a set of individuals who have an account with C.

Identities of an individual: In one embodiment, an individual/preferably has three identities associated with him or her:

1) A real identity, RI which may correspond to I's e-mail address that is being surveilled. RI is preferably established between I and C when I signs up for service with C. RI is preferably represented by a verification/signing key-pair: $RI=(VK_{RI}, SK_{RI})$. The company C stores $VK_{RI}$ and $VK_{RI}$ is known only to J, L, and C. In particular, RI is preferably not known to E. RI is preferably stored safely by I, does not get compromised, and acts as the root-of-trust for all other keys involving I.

2) An anonymized identity, AI, which corresponds to a nickname associated with RI. When a user signs up for service with a company, they are preferably asked to create the anonymized identity AI which is linked by C to their real identity RI. The user can preferably create only one anonymous identity with a service provider (e.g., one nickname per e-mail address). AI can optionally be represented by a keypair: $AI=(VK_{AI}, SK_{AI})$. Anonymized identities are preferably used to avoid having the enforcer know RI. The company C stores $VK_{AI}$, which is known and revealed to E, J, L, and C during the surveillance period.

3) A pseudonymous identity, $PI_i$; $i \in [1 \ldots m]$, represented by $PI_i=(VK_{PI_i}, SK_{PI_i})$ which preferably corresponds to I's pseudonym associated with AI. The pseudonymous identity can be chosen from a set of m identities, with the restriction that only one pseudonymous identity can be active at any given point of time, and a pseudonymous identity cannot be reused. Pseudonymous identities, as opposed to real and anonymized identities, are preferably transient key-pairs. $VK_{PI}$ is known and revealed to E, J, L, and C. The company preferably stores all historical $VK_{PI}$s for future verification.

An individual storing data on company servers: Although SAMPL enables the auditing of a broad range of data and application types, user emails are used for illustration herein. Later in the application, we generalize this requirement. When an individual I signs up for service with a company C, it interactively creates a symmetric key $K_{CI}$ to be shared between C and I. I uses $K_{CI}$ to encrypt sensitive information, but keeps the date and time as plaintext and signs the whole message. $K_{CI}$ can be updated periodically. C and/agree on two parameters, bSize and bNum, which denote batch size and batch number.

The batch size represents the intervals at which the user's messages are batched. The batch number indicates the batch a given message originates from. Let I's total data records, e.g., emails be denoted by T. Then bNum=T bSize, bSize can be a static or dynamic parameter. In the static case, I sets up bSize at the time of service initiation with C, and doesn't change it; in the dynamic case, bSize can be changed by I as needed. SAMPL supports both these implementation choices I preferably creates and encrypts each email with $K_{CI}$ before sending it to C. At the end of each batch, C creates a Merkle tree with the hashes of all messages in the batch at the leaves. C sends the root hash of the Merkle tree to I. I verifies the root hash calculation, signs it if it is accepted, and sends it to C. All signatures preferably contain a timestamp which has sign date and time. C then discards the Merkle tree and archives just the signed root hash, because C can create the Merkle tree on demand from the stored ciphertexts as needed.

Role of Enforcer, E: Each communication between L and C involves them independently passing the message to E for verification. Once E verifies that the message is not over-requesting or over-sharing data with respect to an approved court order, the message is passed on to the intended recipient (C or L). When surveillance data from C is approved by E and received by L, C sends the shared key, $K_{CI}$ directly to L, who can then decrypt the information and carry out the investigation. Although the enforcer can be any desired individual or group thereof, in one embodiment, the enforcer can preferably be a government watchdog or organization that oversees adherence to laws and rights by private companies and law enforcement agencies. Federal agencies have their own oversight entities, e.g., FBI is audited by the Department of Justice's Office of the Inspector General ("OIG"). Other federal agencies also have their corresponding auditing entities. These entities currently do auditing when needed, and hence the auditing always happens after the event. In one embodiment, the OIG can play a proactive role in auditing such process, and enforce accountability from the beginning, rather than play a reactive role and issue review and audit reports after-the-fact, as it currently does.

Blockchain and its operations: The blockchain, BC, is preferably used as an official record for verification of actions performed, it can be used as an off-the-shelf enabling technology. When forwarding a request, each entity preferably posts a signed hash of the request and/or response to the blockchain-a transaction-all messages posted on the BC are signed. The BC also serves as a platform to announce new cases to public watch dogs and the general public without divulging investigation details. The miners ensure that only valid entities involved in an investigation can post transactions to the BC. SAMPL can be implemented using a permissioned blockchain with read-only access given to public. For efficiency and fast convergence, proof-of-stake can optionally be used as the distributed consensus mechanism. The infrastructure required for the BC can be maintained and managed by the judicial system to engender greater trust.

In one embodiment, the following general assumptions can be made as to the various parties:

1) Judge J: The judge J is assumed to be honest, but forgetful, i.e., J might forget to unseal records at the right time. J is trusted to correctly generate a surveillance order ("SO") and place it on the BC. Whenever SO's seal expires, members of U can choose to contact J to make public the contents of SO. U can then verify details of case, including contacting I as needed.
2) Law enforcement agency L: L is assumed to be malicious, in that L will try to over-request data beyond what is authorized by the SO issued by J. Once the SO is posted by J on the blockchain, L will contact E with a surveillance request (SR). SR will be checked and ratified by E based on the SO and prevalent policies.
3) Company C: C is assumed to be malicious, in that C can over-share data beyond what is sought by the SR, and authorized by J's SO. If C fails to respond to an SR with a surveillance request response ("SRR"), then there are policy measures that can be exercised by J to enforce compliance.
4) Enforcer E: E verifies each SR generated by L and also verifies each SRR generated by C, respectively. E is assumed to be honest. The enforcer only knows I's anonymized identity, AI and pseudonymous identity, PI. In particular, E is not privy to I's real identity RI. E also preferably does not have access to the plaintext version of I's records stored with C (e.g., emails). When a certain threshold of failures on the part of L, C is reached (which can optionally be an implementation specific system parameter), E can choose to contact J and post a message to BC exposing identity of the faulty party. The enforcer preferably does not store information linking AI and PI after evaluating an SRR.
5) No collusion assumption: in one embodiment, L and C are assumed not to directly communicate with each other—instead, they preferably go through E for information exchanges. If L and C break this protocol and interact directly, auditable data structures can optionally be used to verify the operations of C. However, out of band, unbridled data exchange is difficult to prevent when both parties are complicit. Nevertheless, for accountability, it is in L's and C's interest to act according to due process, and go through E, and not collude.

Embodiments of the present invention preferably provide the following privacy and security properties:

1) Accountability for L and C: Embodiments of the present invention preferably ensure that a malicious L and/or C cannot over-request, or over-share data, respectively, beyond that authorized by the SO, as long as they do not bypass the entire system, and collude via side-channels. This applies to both: over-requesting/over-sharing of the surveilled user's data, or data belonging to users not listed in the SO (not under surveillance).
2) Forgetful J: Embodiments of the present invention preferably enables an independent set of users, U (which can include for example, non-profit organizations including but not limited to the ACLU) who keep track of court order unsealing dates, to contact the courts to unseal non-sensitive information, contact the individuals who were being surveilled, and help them with further courses of action.
3) Security against malicious I and C: Embodiments of the present invention preferably ensure that a malicious I cannot make C fail E's queries by creating fake ZKP for their real, anonymous and pseudonymous identities. Also, a malicious C cannot create fake data for I and frame I.

The following is a computational assumption for an embodiment of the present invention:

Definition: The DDH problem is hard relative to G for all PPT algorithms A, there is a negligible function negl such that $$|Pr[A(G,q,\partial,\partial^x,\partial^y,\partial^z)=1]$$

$$-Pr[A(G,q,\partial,\partial^x,\partial^y,\partial^{xy})=1]|\leq negl(\lambda)$$

where in each case the probabilities are taken over the experiment in which $G(1^\lambda)$ outputs (G, q, δ), and then uniform x, y, z∈Zq are chosen.

DESCRIPTION OF SAMPL: As a pre-requisite to using SAMPL for surveillance, I and C interact to setup keys, associated ZKPs, and other operations as outlined below. Surveillance on user I's data is preferably carried out with interactions between J, L, C, and E as also described below. In one embodiment, SAMPL has 7 protocols and 4 algorithms. A convention is preferably adopted that communication protocols are run between two or more entities, and algorithms are computations done by a single entity. It is assumed that all communication between entities takes place over secure and authenticated channels.

Protocols 1 and 2 preferably bootstrap the communication between C and I, and the corresponding data exchange. These protocols are preferably required so that in case of surveillance request by L for I's data, E can verify the user data without gaining any knowledge about the identity of I.

| Protocol 1: Setup run between C and I. |
| --- |
| Input: Public parameters: Group $\mathbb{G}$, q = $|\mathbb{G}|$, g, h ∈ $\mathbb{G}$. |
| Output: I establishes RI, AI, $PI_i$, bSize and $K_{CI}$ with C. |
| Parties: C and I. |
| 1   User I sets up ($VK_{AI}$, $SK_{AI}$) and ($VK_{PI_i}$, $SK_{PI_i}$), and sends the ZPKs, their verification metadata and signatures on the ZKPs: ($\pi_{AI}$, $\pi_{PI_i}$), zkpVerf, and ($\sigma_{AI}$, $\sigma_{PI_i}$), respectively, to C. |
| 2   User I sets up a shared key with C, $K_{CI}$, used to encrypt I's data stored on C's servers. |
| 3   C and I agree upon and setup a batch-size, bSize ∈ $\mathbb{Z}$. |

Protocol 1: This is preferably run by an individual/the first time he or she sets up an email account with company C. In Line 1, I does two 3-round ZKPs with C to prove that: 1)

$VK_{AI}$ was produced by someone who has knowledge of $SK_{RI}$, and 2) $VK_{PI_i}$ was generated by someone who has knowledge of $SK_{AI}$ (if C accepts $VK_{AI}$ as valid). At the end, C preferably receives from/a copy of $VK_{AI}$, $VK_{PI_i}$ and their associated ZKPs, $\pi_{AI}$, $\pi_{PI_i}$, and signed copies of the ZKPs: $\sigma_{AI}$=Sign$_{SK}(\pi_{AI})$, $\sigma_{PI}$=Sign$_{SK}(\pi_{PI})$, along with some public verification metadata, zkpVerf, which will preferably be used by the Enforcer for verifying the ZKPs. The proofs are preferably Chaum-Pedersen-style interactive ZKPs, which can be made non-interactive using the Fiat-Shamir transform. Because the ZKPs are essentially used as black-boxes, in order not to distract the reader with their details.

Next, I and C setup a shared key $K_{CI}$ using which I's emails stored on C's servers are encrypted. I and C also agree upon a batch-size bSize, which denotes the message-intervals at which I's emails will be batched, e.g., after every 100 emails. C preferably batches all of I's emails at bSize intervals and creates a Merkle hash tree for the batch with the hashes of the emails at the leaves; I preferably verifies and signs the root of the tree.

---

Protocol 2: Exchange of data between C and I for a given batch.

Input : Public parameters: bSize, bNum ∈ [1..maxbNum].
Output:C stores I's emails along with verification hashes.
Parties:C and I.
1  Let $\mathbb{M}_{bNum}$ represent the set of all e-mail messages in bNum.
2  for each $M_x \in \mathbb{M}_{bNum}$, x ∈ [1..bSize] do
3      I encrypts $M_x$:$\mathcal{C}_x \leftarrow K_{CI}(M_x)$, sends $\mathcal{C}_x$ to C.
4      C stores $\mathcal{C}_x$.
   end
5  /* At the end of batch bNum of bSize messages: */
   Let $\mathcal{C}_{bNum}$ represent the set of all ciphertexts in bNum.
6  begin
7      C generates hashes, $H_x = H(\mathcal{C}_x)$, for all the $\mathcal{C}_x$ received from I.
8      C forms a Merkle tree $M_{bNum}$, with the $H_x$s at the leaves, and $R_{bNum}$ as root of the Merkle tree.
9      C sends $M_{bNum}$ and $R_{bNum}$ to I.
10     I verifies that the root hash ($R_{bNum}$) of $M_{bNum}$ is correctly computed:
       10.1 If verification fails, I notifies C to retry.
       10.2 Else, I signs $R_{bNum}$: $\sigma_{R_{bNum}} \leftarrow$ Sign$_{SK_{PI_i}}(R_{bNum})$, sends $\sigma_{R_{bNum}}$ to C and deletes all local copies of $M_x$.
11     C stores $\sigma_{R_{bNum}}$ along with previously stores $\mathcal{C}_x$'s for batch bNum.
   end

---

Protocol 2: Protocol 2 depicts /'s emails being stored on C's servers. Before/and C preferably execute this algorithm, they would have already run Protocol 1 to setup the symmetric key $K_{CI}$. I creates an email message $M_x$ and encrypts it with $K_{CI}$, generating $C_x$, before forwarding it to C (Lines 2,3,4). This already happens in OpenSSL, where the connections (and data transmitted) between two communicating entities are encrypted using pairwise symmetric session keys.

At the end of the current batch bNum, let $C_{bNum}$ represent the set of all ciphertexts in bNum. C calculates hashes for all $C_x \in C_{bNum}$ and uses them as leaves to create a Merkle hash tree $M_{bNum}$ (Lines 7,8). C sends $M_{bNum}$ and the root hash ($R_{bNum}$) of the Merkle tree to I (Line 9). I preferably verifies that $R_{bNum}$ calculation is correct for the current batch. I signs the verified $R_{bNum}$ and sends $\sigma_{R_{bNum}}$ to C (Line 10.2). I can then delete all the data stored locally because it is available for future retrieval from C. C stores $\sigma_{R_{bNum}}$ and discards the Merkle tree for the batch (Line 11). This construction helps reduce the space overhead significantly. This process is repeated for all future batches. If I found $R_{bNum}$ to be wrongly calculated, then I does not sign $R_{bNum}$ and C is contacted to reconstruct the Merkle tree and try again (Line 10.1).

The communication model under SAMPL can be divided into four phases, which are illustrated depict in FIG. 1.

Phase 1 is illustrated in steps 1-7 of FIG. 1, described in Protocol 3, and represents the first phase of SAMPL. It describes the collection of information by J to validate the need for an SO, create, and post it to BC. This allows members of U to verify public data in SO for accountability of L and C, and allows L to conduct surveillance on data for I.

Phase 2 is illustrated in steps 8-11 of FIG. 1, described in algorithm 4 and algorithm 5, and represents the second phase of SAMPL. In algorithm 4, L creates the SR corresponding to the SO created in phase 1, and in algorithm 5 accountability is enforced for L by having E verify the SR before sending it to C.

Phase 3 is illustrated in steps 12-15 of FIG. 1, described in algorithm 6 and algorithm 7, and represents the third phase of SAMPL. In algorithm 6, C creates the SRR corresponding to the SR received in phase 2, and in algorithm 7 accountability for C is enforced by having E verify the SRR before sending it to L.

Phase 4 is illustrated in step 15 of FIG. 1, described in Protocol 8, and represents the fourth phase of SAMPL. In Protocol 8, L decrypts the user information and conducts the surveillance specified in the SO.

---

Protocol 3: J issuing SO and posting SO on BC.

Input: $VK_{AI}$,$VK_{PI}$ of user I, $\mathbb{G}$, g, h ∈ $\mathbb{G}$, q = |$\mathbb{G}$|
Output: J issues SO, sets up keys $K_{JLC}$,$K_{EJLC}$ and transmits them to relevant parties.
Parties: E,J,L, and C.
1  L issues a request to J:SR = ($VK_{RI}$||evidence).
2  J validates L's request. If "accept" ← Jdecide(SR), J generates IO = ($VK_{RI}$||evidence) and gives to L.
3  L gives IO to C; C validates the IO. If "accept" ← Cdecide(IO), C sends to J and L, ($VK_{AI}$||$\sigma_{AI}$||$\pi_{AI}$), given to C by I in Protocol 1.
4  J validates C's response, checks if
   "true" ← Verify($VK_{AI}$,$\sigma_{AI}$,$\pi_{AI}$), and if
   "true" ← ZPKVerify($VK_{RI}$||$VK_{AI}$||$\pi_{AI}$||zkpVerf), and does the following:
   4.1 Pick $K_{JLC} \leftarrow \{0, 1\}^\lambda$, send to L and C. Pick $K_{EJLC} \leftarrow \{0, 1\}^\lambda$, send to E,L,C.J also picks $r_2,r_3 \leftarrow Z_q$, g,h ∈ $\mathbb{G}$, and generates Pedersen commitments: Com$_1$ = ($g^{K_{JLC}}h^{r_2}$), Com$_2$ = ($g^{K_{EJLC}}h^{r_3}$).
   4.2 J creates P1 = ($VK_{RI}$||evidence). P1 is encrypted with $K_{JLC}$ and hence is accessible only to J, L and C. P1 is transmitted to L and C for verification and signatures.
   4.3 J verifies the received signatures of L and C on P1, and embeds the signatures of J,L,C on P1: $\sigma_{JP1}$,$\sigma_{LP1}$, and $\sigma_{CP1}$ in P2, to preserve identity of L and C.
   4.4 P2 contains $VK_{AI}$, start/end dates t = [$t_s$,$t_e$], among other information, is encrypted with $K_{EJLC}$, and sent to L and C for verification and signatures $\sigma_{LP2}$, $\sigma_{CP2}$, $\sigma_{JP2}$, $\sigma_{LP2}$, $\sigma_{CP2}$ are then appended to the SO as P3.
   4.5 Generates SO ← OrderGen($VK_{AI}$||$VK_{RI}$||evidence), which has format as described below:
       SO = <metadata||$\sigma_{metadata}$||$C_{P1}$||$C_{P2}$||$C_{P3}$>,where
       CP1 = $E_{JLC}$(P1)
       CP2 = $E_{EJLC}$(P2)
       CP3 = $E_{EJLC}$($\sigma_{JP2}$||$\sigma_{LP2}$||$\sigma_{CP2}$)

---

Protocol 3: Protocol 3 presents the interaction between J, L, C, and E, which culminates in J issuing a surveillance order SO, and setting up surveillance-related keys. In Line 1, L approaches J with evidence of suspicious behavior on the part of/which forms the surveillance request (SR). Here, evidence represents the documented evidence supporting the SR. J has its own internal decision procedure, Jdecide. It decides whether to accept or turn down the request (Line 2). If J decides to reject the request, L will have to return with an updated request SR=(VK$_{RI}$∥evidence), if L wants VK$_{AI}$ to persist with the request.

If the request SR is accepted, J preferably generates an intermediate order IO, and gives it to L who forwards it to C. If C decides to comply (according to C$_{decide}$), it retrieves VK$_{AI}$ corresponding to VK$_{RI}$, sends to L, along with π$_{AI}$, and σ$_{AI}$ obtained in Protocol 1. L forwards this info to J (Line 3). If C decided to not comply with IO (e.g., request violates statutory company policy), C would address the reasons to L prompting potential intervention from J, which is a judicial matter and out of scope of SAMPL.

Figure 2:
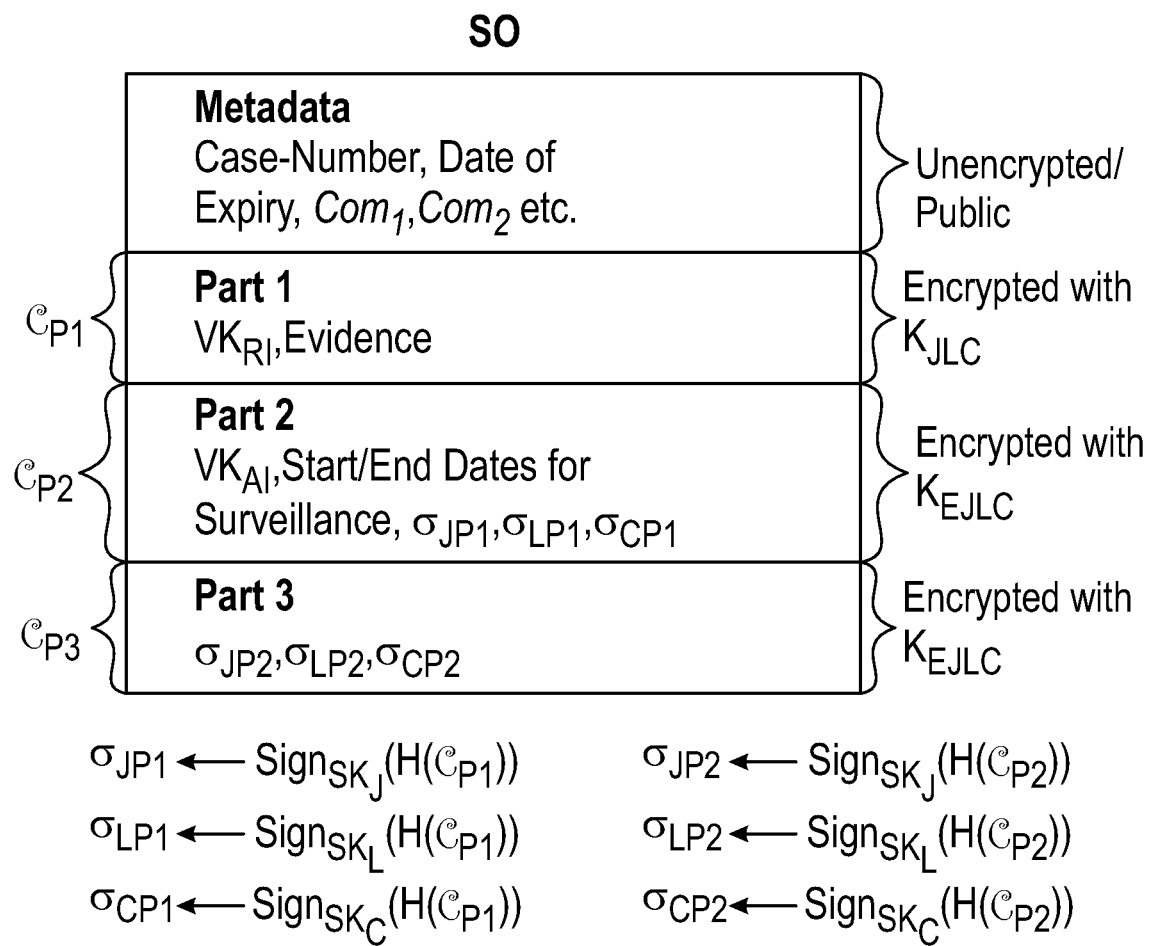
FIG. 2 is a diagram which illustrates structure of a search order which is preferably generated by a judge.

On receiving info from C, J preferably independently verifies the ZKP associated with VK$_{AI}$ and the signature on it (Line 4). If the verification fails, J preferably notifies C and L, and exits. If the verification passes, J generates two symmetric keys: K$_{JLC}$ meant to be shared between J, L, and C, and K$_{EJLC}$ meant to be shared between E, J, L, and C. J preferably then issues a surveillance order SO which is preferably formatted as illustrated in FIG. 2. The metadata can optionally include one or more of case number, date of unsealing, and Pedersen commitments Com$_1$ and Com$_2$ to K$_{JLC}$ and K$_{EJLC}$, respectively, and any other information that can be made public about the case. The commitments are needed to hold J accountable. Part 1 ("P1") preferably contains data meant to be shared between J, L, and C only, and includes VK$_{RI}$ and the evidence. P1 is preferably encrypted with K$_{JLC}$ (Line 4.2), and the hash of the encrypted P1 is signed independently by J(σ$_{JP1}$), L(σ$_{LP1}$), and C(σ$_{JP1}$). These signatures are preferably included inside Part 2 ("P2") along with VK$_{AI}$, start/end dates of surveillance (t$_s$, t$_e$) respectively. P2 is preferably encrypted with K$_{EJLC}$, before it is sent for verification and signing to J, L, and C which yield σ$_{JP2}$, σ$_{LP2}$ and σ$_{CP2}$, respectively on successful verification. Before C signs a hash of encrypted P2, it preferably verifies that VK$_{AI}$ contained in P2 corresponds to VK$_{RI}$ contained in P1 that it had signed, i.e., σ$_{CP1}$.

These signatures are preferably then verified by J, encrypted with K$_{EJ\ LC}$ and added to SO as part of Part 3 ("P3"). The signatures are preferably included in the encrypted text to preserve the identity of L and C from public until the SO is opened to public. Signatures on C$_{P1}$ and C$_{P2}$ are verified by E to hold J, L, and C accountable. The different kinds of SOs are discussed in later in the application.

---

Algorithm 4: L creating and posting SR on BC, and sending to E for verification.

---

Input: SO created on BC.
Output: Surveillance request SR created and sent to E.
1  begin
2  | L creates a surveillance request:
    |    SR = (SO∥t = [t$_s$,t$_e$]∥VK$_{AI}$∥C).
3  | L generates and posts H(SR) to BC.
4  | L sends SR to E, who handles it as described in Algorithm 5.
5  end

---

Algorithm 4 illustrates an example of the surveillance request, ("SR") that can be created by L after J posts SO to the blockchain, ("BC"). L preferably creates an SR by creating a tuple with the start/end dates for the requested surveillance time interval, t=[t$_s$, t$_e$] (see Line 2). L includes the AI of the intended surveillance target, VK$_{AI}$. A reference to the original SO and the identity of C (whom the SR is intended for), is also preferably included in the SR, which can be in the form of a tuple. L then preferably posts the hash of the SR on the BC and forwards SR to E for verification (see Lines 3 and 4 of algorithm 4).

In SAMPL, the Enforcer uses the start/end times listed in the SO, and the pseudonymous identities of the email senders listed in the SO to check for over-requesting by L and over-sharing by C. This can be extended to the Enforcer checking pseudonyms of recipients too, filtering by subject of e-mails, etc., which gives finer auditing granularity. This preferably will not affect the base system design, but can require more computations and verifications on the part of I, C, and E.

---

Algorithm 5: E verifying SR received from L.

---

Input: SR received from L
Output: Accept or reject SR.
/* Verify SR does not violate SO published on BC by J. */
1  E retrieves K$_{EJLC}$ sent by J in Protocol 3, does
    P2 ← D$_{EJLC}$(C$_{P2}$), posted on BC, and accepts SR as valid if:
2  begin
3  | The VK$_{AI}$ of P2 and SR match.
4  | The time interval, t = [t$_s$,t$_e$] contained in SR is within the
    |    timeline specified in P2.
5  end
6  If E accepts SR, a confirmation is posted on BC. Since all BC transactions are signed, we denote the corresponding transaction signature as σ$_{SR}^E$ and SR is forwarded to C.
7  If E rejects SR, it notifies agency L and judge J, and SR is not sent to C. It also stores evidence of the reason for rejection, which will be provided to J,L upon request

---

In algorithm 5, E preferably receives the SR from L and processes the SR. The verification preferably includes checking that the time interval/from SR is a sub-interval of the timeline contained in P2 of SO. After E verifies SR, it preferably signs the hash, H (SR), and posts the signature σ$_{SR}^E$ on BC. Then SR is forwarded to the C that is preferably listed as the intended receiver in SR. If SR fails to verify with E, no message is posted on the BC, and SR is not forwarded to C. If fine-grained accountability is desired, the failure message can optionally be posted to BC, identifying the reason and scope of the failure.

---

Algorithm 6: C creating SRR, posting H(SRR) on BC, and sending SRR to E for verification.

---

Input: SR received from E.
Output: SRR created and forwarded to E.
/* When C receives a validated SR from E, it does the following: */
1  begin
2  | C decrypts e$_{P3}$ of SO contained in SR, verifies signatures
    | σ$_{JP2}$, σ$_{LP2}$, C then decrypts P2 of SO, verifies σ$_{JP1}$, σ$_{LP1}$,
    | It then checks if (t,VK$_{AI}$) contained in SR corresponds to
    | what it had signed in σ$_{CP2}$.
3  end
/* C create an SRR in response to the SR as follows */
4  begin
5  | C retrieves and verifies signature σ$_{SR}^E$ posted on BC.
6  | Let C$_{bNum}$ represent the set of all ciphertexts in bNum.
7  | for each e$_x$ ∈ C$_{bNum}$; x ∈ [1..bSize] for VK$_{AI}$ do
8  | | if e$_x$ was created during time-period t = [t$_s$,t$_e$] from
    | | SR then
9  | | | Add e$_x$∥siblingHashes(e$_x$)∥bNum∥σ$_{R_{bNum}}$ to SRR,
    | | | Add the signed ZKP for VK$_{PI_i}$ used to verify
    | | | σ$_{R_{bNum}}$ (j ∈ [1..m]) to SRR:

Algorithm 6: C creating SRR, posting H(SRR) on BC, and sending SRR to E for verification.

```
         |   |  (σ_AI||π_AI||σ_PI_i||π_PI_i||g||zkpVerf), where zkpVerf
         |   |  is some metadata given to C by I for ZKP
         |   |  verification (details in Appendix A, Protocol 11).
10       |   end
11       | end
12       |  C adds the identity of L to SRR The final SRR is given
         |  below.
         |         SRR = <SR||L||C_x||siblingHashes(C_x)||
         |                bNum||σ_RbNum||σ_AI||π_AI||σ_PI_i||
         |                π_PI_i||g||zkpVerf>
13       |  C generates and posts H(SRR) on BC.
14       end
         /* C sends SRR to E.                                    */
15   C sends SRR to E, who processes it as described in Algorithm 7.
```

Algorithm 7: E verifying SRR received from C.

```
     Input: SRR received from C.
     Output: Accept or reject SRR.
1    E retrieves SR from SRR, and verifies signature σ_SR^E posted on
     BC.
2    for each C_x ∈ SRR;x ∈ [1..bSize] do
3    |  E confirms that C_x is dated within time period t from the
     |  SR.
4    |  E computes H(C_x). runs
     |     R_bNum ← rootCompute(C_x||siblingHashes(C_x)||bNum),
     |  and checks "true" =? Verify(VK_PI_i,R_bNum,σ_RbNum),
5    |  Finally, E verifies ZKP for VK_PI_i used to sign σ_RbNum with
     |  given (σ_AI||π_AI||σ_PI_i||π_PI_i||g||zkpVerf).
6    end
7    If E accepts SRR, a confirmation is posted on BC. Since all BC
     transactions are signed, we denote the corresponding
     transaction signature as σ_SRR^E; and SRR is forwarded to L,
     who handles it as described in Protocol 8.
8    If E rejects SRR, it notifies J,C and SRR is not sent to L. It also
     stores evidence of the reason for rejection, which will be
     provided to J,C upon request.
```

Figure 3A:
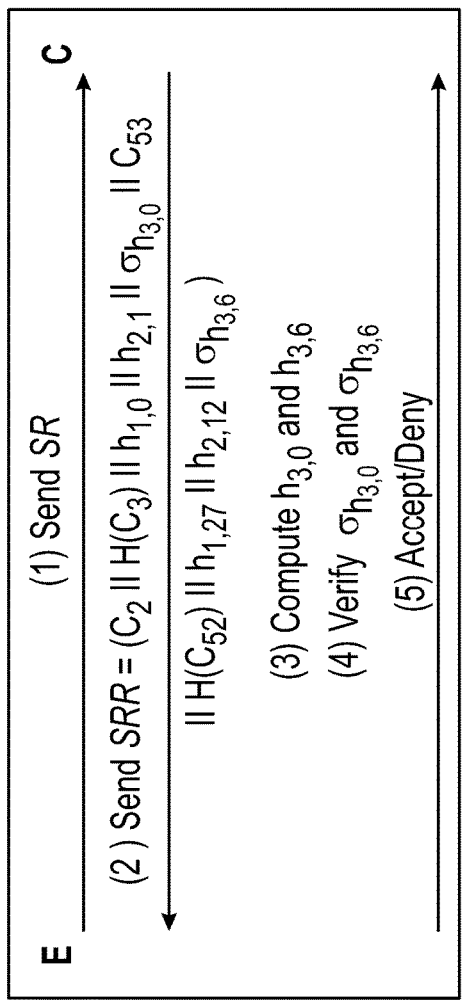
FIG. 3A is a diagram which illustrates preferred communication between C and E according to an embodiment of the present invention.
Figure 3B:
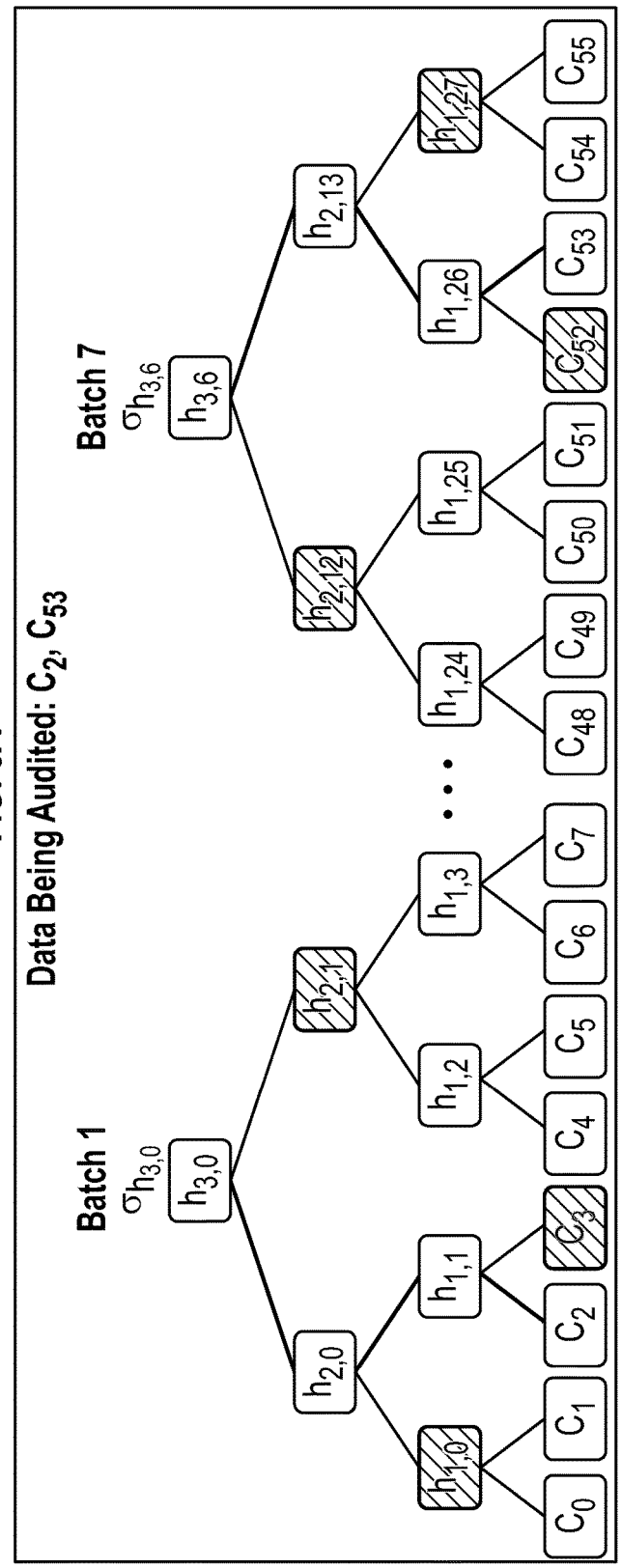
FIG. 3B is a drawing which illustrates an example of Merkle trees in an SRR.

Algorithm 6 and algorithm 7 cover interaction between E and C, as illustrated in FIG. 3, where C responds to an approved SR with an SRR containing requested user data. C preferably selects user data that matches criteria outlined in SR (depicted by shaded items in FIG. 3(b)) and adds the data to SRR before sending it to E for verification. E preferably verifies the SRR and either forwards it to L, if approved, or contacts C if the verification failed.

In algorithm 6, when C receives a verified SR from E, C preferably verifies that t and $VK_{AI}$ listed in SR are the ones actually signed by C in P2 of SO (See line 2 of algorithm 6). C preferably then creates an SRR in response to SR. C checks each message stored corresponding to $VK_{AI}$ listed in the SR. If some message ("$M_x$") in batch ("$b_{Num}$") matches the surveillance time ("t") in SR, then the encrypted message ("$C_x$"), the sibling hashes for $H(C_x)$ in the Merkle tree for $b_{Num}$, and $σ_{bNum}$ are preferably added to the SRR by C (See line 9 of algorithm 6). C preferably also includes the ZKP for the $VK_{PI_i}$ used to sign $σ_{bNum}$ (see line 9). Once C has finished processing all messages for the $VK_{AI}$ listed in SR, C preferably adds the identity of L to SRR and then posts a signed hash of SRR to BC (See line 13). SRR is preferably then forwarded to E (See line 15).

For ease of exposition, SRR creation for one batch ($b_{Num}$) is presented. However, if there exist multiple batches, $b_{Num_i}$; i∈[1 . . . . T/bSize], where T is the total number of I's messages stored on C, lines 7-11 of algorithm 6 are preferably repeated for all the batches. In line 12 of that algorithm, the SRR preferably includes corresponding C, sibling hashes, batch number, root of the Merkle hash tree, concatenated in order.

In algorithm 7, E preferably receives the SRR from C, and parses its contents. E verifies the signature ($σ_{SR}^E$) on the corresponding SR (See line 1 of algorithm 7). For each $C_x$ that appears in SRR, E checks that the message is dated within the time period t=[$t_s$, $t_0$] from SR (See line 3). Then, the root hash for $C_x$, $R_{bNum}$, is preferably computed using the sibling hashes for $C_x$ provided in SRR, and the signature $σ_{R_{bNum}}$ is verified (See line 4). The ZKP for $VK_{PI_i}$ used in $σ_{R_{bNum}}$ is also preferably verified by E (See line 5). If there are multiple batches, they are preferably verified in succession at this time; as in algorithm 6, this part is omitted from the algorithm and from this description for ease of exposition. After E verifies SRR, it preferably signs H(SRR), and a message containing the signature of E is posted on BC, and SRR is forwarded to L listed as intended receiver in SRR (See line 7). If SRR failed to verify with E, then preferably no message is posted in the BC and SRR is not forwarded to L. If fine-grained auditing is required, a failure message can be written to BC.

Protocol 8: L on receiving validated SRR from E.

```
     Input: Verified SRR received by L from E.
     Output: Surveillance carried out by L.
     Parties: L and C.
1    L receives SRR, and posts a signed hash of SRR to BC as
     acknowledgment of SRR received.
2    L gets K_CI from C to decrypt I's emails (C_x's contained in
     SRR), and carry out surveillance.
```

In Protocol 8, once L receives a validated SRR from E, it preferably posts a signature on the hash of SRR to BC as acknowledgment. L then preferably asks C to hand over $K_{CI}$ to be able to decrypt I's encrypted emails in SRR and conduct surveillance.

Protocol 9 is preferably not a part of the regular workflow of SAMPL and is optionally executed by members of U on an as needed basis. It can optionally be implemented using smart contracts. In Protocol 9, any member(s) of a set of watchdog organizations, u∈U (e.g., ACLU), who monitor the BC, can contact J whenever an SO expires and retrieve $K_{JLC}$, $K_{EJLC}$. Entity u preferably decrypts the SO (P1 and P2), verifies signatures (P3), and can contact I who was surveilled. I and u can then investigate and verify the validity of reason for surveillance, if due diligence was applied, and lawful procedures were followed during surveillance.

Protocol 9: Protocol run by members of U.

```
     Input: SO posted on BC.
     Output: u checks adherence to protocol by parties involved in
             surveillance in relation to SO and follows up with J.
     Parties: u ∈ U and J.
     /* Whenever there is a message posted on BC by E:
                                                         */
1    u ∈ U checks the signatures of the hashes posted.
     /* Whenever an SO expires according to t ∈ [t_s,t_e]
        posted on BC:                                    */
2    u contacts J and retrieves K_JLC,K_EJLC. u decrypts P1, P2 and
     verifies P3 of the SO.
```

The U.S. constitution provides several authorization paths for law enforcement agencies to obtain permission to conduct surveillance, some with judicial oversight, some without. The Electronic Communications Privacy act ("ECPA") was created by the U.S. Congress in 1986 to elucidate the boundaries of government surveillance on citizens, and clearly define the ways and means by which government surveillance can be conducted. The ECPA can be used by federal law enforcement agencies to obtain information about users' emails in transit, emails at rest, phone calls, location data, and more. The ECPA provides law enforcement agencies two methods of accessing users' information: via a warrant, or via a subpoena. A subpoena is a court order demanding that someone or something be provided to assist in a case. For issuing a warrant, the law enforcement agency must show the issuing judge probable cause that a crime has been or will be committed. Most warrants are unsealed when charges are filed against someone, and the defendant has the right to see the evidence collected against them before the trial.

Per ECPA statute 18 U.S.C. § 2616 and statute 18 U.S.C. § 2703, emails in transit, emails in storage on a home computer, and unopened emails in remote storage stored for up to 180 days need a warrant for law enforcement access. Opened emails in remote storage, and unopened emails stored for greater than 180 days only need a subpoena for law enforcement access.

Embodiments of the present invention can be deployed in a straightforward manner in both cases, as previously described, where the SO written to the blockchain by J can be either a subpoena or a warrant. The SR and the furnished data are preferably all routed through Enforcer, E, who writes the data transfer success/failure to the blockchain BC for auditing as previously described.

The USA Patriot act § 505 empowered the Federal Bureau of Investigation ("FBI") to issue a National Security Letter compelling companies to disclose information about their customers for a national security-related investigation. A national security letter ("NSL") is typically issued to a company by a local FBI field office and does not require judicial oversight. It can be used to obtain meta-information about phone/email records, times, length of service, network addresses, and how a customer paid for service; although the FBI cannot obtain actual content of phone/email records. An NSL can also be used by the FBI to obtain financial details, such as credit reports, and bank account details from banks, credit unions and insurance companies. Any recipient of an NSL is prohibited by law or "gagged" from disclosing their receipt of the NSL, which makes oversight difficult. Additionally, the U.S. government can seek judicial enforcement of an NSL in non-compliance situations, under ECPA statute 18 U.S.C. § 2709.

Because an NSL does not require a judge, there is no J to post the SO to BC. But L and C can still use SAMPL and hence E for auditability. In this case, L can create an SO for the NSL, post it on BC, and then create an SR, before sending it to E. E can then pass it on to C, after checking that the SO and the SR do not request content of emails, which is a legal restriction on NSLs. Note that E cannot check if a SO is for a genuine national security issue, because U.S. law expressly gives discretionary powers to the FBI while deciding to issue NSLs. But what E can help check is if the SO and SR adhere to legal guidelines—that is, the agency is only seeking meta-information. On receipt of the SR from E, C will preferably construct and return an SRR to E, who will then verify it and send it to L.

The pseudonymous identity scheme of embodiments of the present invention prevent E from learning the actual identities of the users whose details were requested. As discussed before, E preferably writes the pass/fail result of the SR and SRR to the BC.

Foreign Intelligence Surveillance Act ("FISA") was enacted in 1978 and amended in 2008 by the U.S. Congress for the purposes of surveillance related to foreign powers and persons. Under FISA, a person who is believed to be a foreign power, or spying on behalf of a foreign power, can be put under surveillance, even if they haven't engaged in any criminal activity. Over the years, the ambit of FISA has gradually expanded to include electronic surveillance, "roving wiretap" surveillance, pen-registers, and trap-and-trace devices, per 50 U.S.C. Ch. 36. Additionally, FISA permits warrantless surveillance up until certain time periods, beyond which the agency conducting the surveillance needs to obtain a warrant from a special court called the FISA court. Although the court maintains records of its proceedings, the FISA court's records are not available to the public.

Embodiments of the present invention can be applied to the FISA ecosystem, which encompasses the court, and surveilling agencies which work with it-including but not limited to the NSA. The FISA ecosystem operates with little to no auditability (other than annual aggregate statistics published by the court). Using embodiments of the present invention, the FISA court judges will issue and post an encrypted SO on the BC. The E can verify that the surveillance is not conducted in wholesale or an overarching manner by agencies, and only data that is pertinent to an ongoing investigation is revealed by companies. In particular, embodiments of the present invention allow independent non-profit organizations to verify if due process has been followed during FISA-authorized surveillance, even if the actual court orders are never made public, without compromising national security.

In the U.S. legal system, a government agency, which can include for example FBI or NSA is, in most cases, required to present a warrant to a company for conducting surveillance on its customers, and conduct the surveillance within the confines of the warrant. Unfortunately, in practice, there are agency overreaches; including for example:

1) In 2018, the NSA's office of inspector general ("OIG") in its first semi-annual unclassified report to the U.S. Congress described the investigations and activities of the NSA. Among other findings, the OIG report found "several deficiencies that have the potential to impact the protection of U.S. persons privacy rights," in relation to FISA investigations conducted by the NSA.

2) A report by the department of justice (DoJ) OIG found that the FBI issued NSLs "contrary to statutory limitations," issued "improper requests under the statute referenced in the NSL", "obtained information beyond the time period referenced in the NSL," and various other illegal uses of NSLs. A partially redacted 300-page report by the DoJ OIG also found that the FBI acquired phone call information regarding "hot numbers" without legal process, made inaccurate statements to the FISA court, and improperly used FBI administrative subpoenas. The OIG report also found that the FBI used "exigent letters" and other informal requests for phone records that do not comply with legal requirements or FBI policies governing the acquisition of those records. The same report also found the FBI has a practice of conducting "sneak peeks" for telephone toll records in providers' databases without due process, a practice that violates the ECPA statute 18 U.S.C. § 2702(a)(3).

All said, embodiments of the present invention can help systematize a seemingly unpredictable process that can help law enforcement agencies and companies ensure that they follow the letter of the law with respect to issuing and responding to surveillance requests respectively.

Embodiments of the present invention can also be used in the well-known universal composability ("UC") framework. The UC paradigm elegantly captures the conditions under which a given distributed protocol is secure, by comparing it to an ideal realization of the protocol. To this end, the UC framework defines two "worlds": the real-world, where the protocol, π to be proved secure runs in the presence of a real-world adversary, A. The other is the ideal-world, where the entire protocol, φ is executed by an ideal, trusted functionality, in the presence of a simulator, S, which models the ideal-world adversary. All users only talk to an ideal functionality via secure and authenticated channels, the ideal functionality takes input from users, performs some computations in a possibly interactive manner, and returns the output of the protocol. The goal then is to prove that no distinguishing algorithm, commonly referred to as the "environment", Z, can successfully distinguish between the execution ("EXEC") of the two worlds.

Ideal functionality, $F_{Surveil}$, which encompasses all these functionalities and algorithms, and consists of four independent ideal functionalities, $F_{surveil} = (F_{zk}^{SAMPL}, F_{init}, F_{create}, F_{BC})$. Furthermore, $F_{surveil}$ is assumed to maintain an internal state that is accessible at any time to $F_{zk}^{SAMPL}, F_{init}, F_{create}, F_{BC}$.

Theorem 1: Let $F_{Surveil}$ be an ideal functionality for SAMPL. Let A be a probabilistic polynomial-time ("PPT") adversary for SAMPL, and let S be an ideal-world PPT simulator for $F_{Surveil}$. SAMPL UC-realizes $F_{Surveil}$ for any PPT distinguishing environment Z.

SAMPL can apply to other types of surveillance criteria by modifying the way that user records are stored by C. In case of email, the sender and receiver names and their IP addresses can be salted and hashed separately and stored along with other details, which can include for example date and time as well as metadata. This information can be listed in the SO and subsequently verified by E without learning the actual values. This enables search based on sender/receiver names and/or IP addresses. Searchable encryption can be implemented to search based on specific keywords in the data records. Although this increases the types of surveillance auditable, it leaks more information to E.

SAMPL can also be extended to allow a user to delete historical records. The user preferably updates the data record to a generic "deleted message," the Merkle root for the given historical batch is recalculated with the new message, and the user signs the updated Merkle root with the current $SK_{PI}$. Every time $VK_{PI}$ gets updated by the user, C preferably verifies the ZKP and also verifies the signatures on the Merkle root so that I cannot inject fake data and/or signatures to frame an honest C. For practicality, the management of users' $VK_{PI}$s can be handled by software, which can include for example keystores, plugins, etc.

There can be instances where a single user is part of multiple surveillance requests. In that case, each SO has $VK_{AI}$, and E can link it to the corresponding $VK_{PI}$ using the ZKP provided by C. Embodiments of the present invention optionally do not provide unlinkability of the independent surveillances to a user's $VK_{PI}$.

SR can also include requests for system logs showing activity of a certain user identified by $VK_{AI}$. If the logs contain $VK_{RI}$, to preserve privacy, C can optionally replace it with $VK_{AI}$. If the logs contain $VK_{PI}$, then C preferably furnishes the ZKP associated with $VK_{PI}$. Unlike data such as emails, users preferably do not see the logs, hence do not sign them.

There are several design choices in that are implementation-specific and thus can be altered to provide desirable results for different applications a few such aspects include:

1) Set of Enforcers: The assumption on E can be relaxed from being assumed to be honest to being honest but curious. To provide unlinkability of users' PIs over multiple surveillances for a given time period, nonoverlapping striping of data across the set of Es, when sending SR or SRR can optionally be used. Note that the sets of enforcers chosen by L and C need not be the same. This increases the efficiency of verification of the system, as data for verification is not duplicated between different Es. As long as the number of SOs for a given AI does not exceed the number of enforcers in the system, the unlinkability assumption will hold (due to the non-overlapping striping).

2) Internal decision procedures of J, L, and C: Certain actions are largely dependent on the specific jurisdiction, and are governed by the laws of the country where J, L, and C operate. What exactly J, L, and C do when any of their internal decision procedures return a "reject" in the course of operation can be adjusted to fit a particular application. For example, a policy can be implemented to determine what happens when C decides to reject the IO when the IO violates statutory company policy in some way. Or to determine the course of action for L to follow if J decides to reject its surveillance request.

3) Handling Multiple Users: Although this application attempts to maintain brevity and ease of reading by describing embodiments of the present invention with respect to a single user being surveilled by L, embodiments of the present invention can easily be extended to multiple users (I 1 . . . a) by modifying the SO to include a list of users' identities. This would result in $VK_{RI}^1, \ldots, VK_{RI}^a$, $VK_{AI}^1, \ldots, VK_{AI}^a$, and $VK_{PI}^1, \ldots, VK_{PI}^a$. When multiple identities are surveilled, J preferably salts each users identity by adding a random string to each identity ($VK_{RI}^1, \ldots, VK_{RI}^a$) and hash it before putting it in P1 of SO. This randomization, added to each identity, will help protect the identities of each of the surveilled users from each other whenever the SO expires and is released to the individuals being surveilled. The random salts for all the $VK_{RI}$'s are preferably shared with L and C.

4) Hard reject/soft reject: Whenever an SR or SRR is rejected by E, perhaps due to clerical errors, administrative errors, or otherwise honest mistakes on the part of C or L, E preferably just responds with a reject message and takes no further action. This is referred to as a "soft reject". E can assess how many times a certain party's request/response has been rejected. Once this number of rejections reaches a threshold, which can be a system parameter, E can optionally inform the party whose request/response was rejected, and the judge J, and can store a local copy of the reason for the rejection (to provide to J upon request), and writes a "fail" message to the BC—a hard reject. Note that for fine-grained information on errors and/or malicious behaviors, E can choose to post a soft reject on BC.

5) Auditable data structures: Auditable data structures implemented on C's servers can also be used by E to verify that C is non-malicious and complying with court orders. This implementation would preferably include careful system design with read/write counters on the data stores with E having access to the counters.

TABLE 3

| | Surveillance Period (Days) | | | | | | | | | | | |
|---|---|---|---|---|---|---|---|---|---|---|---|---|
| | 5 | | | | 10 | | | | 50 | | | |
| Number of Users | 5 | 10 | 15 | 30 | 5 | 10 | 15 | 30 | 5 | 10 | 15 | 30 |
| ZKP Verification for $PI_i$ (s) | 0.039 | 0.0795 | 0.1207 | 0.2003 | 0.0750 | 0.1528 | 0.229 | 0.459 | 0.369 | 0.740 | 1.109 | 2.219 |
| Merkle Root Generation (s) | 0.140 | 0.259 | 0.382 | 0.619 | 0.246 | 0.475 | 0.705 | 1.390 | 1.1178 | 2.224 | 3.32 | 6.64 |
| Merkle Sign Verification (s) | 0.015 | 0.0304 | 0.046 | 0.0767 | 0.0286 | 0.0583 | 0.0875 | 0.1757 | 0.141 | 0.282 | 0.423 | 0.846 |

6) Forward Security: If one of I's previously used $SK_{PI}$ gets compromised and C gets access to it, C can fake I's historical data by modifying the Merkle trees for past batches and signing them with the compromised key. To guard against this, each time I chooses a new PI, a new Merkle tree is preferably created between I and C whose leaves are the signed root hashes of the past batches. The root of this new hierarchical Merkle tree is preferably signed with the new PI. This operation can be repeated for each new PI to make it harder for a malicious C to frame I, because C would need to compromise multiple $SK_{PI}$s belonging to I.

---

Protocol 10: Setup of (RI, AI) keypairs.

Inputs: Public parameters: Group $\mathbb{G}$, $q = |\mathbb{G}|$, g, $h \in \mathbb{G}$.
  ZKP Claim: $VK_{AI}$ was generated by someone with knowledge of $SK_{AI}, SK_{RI}$.
  Witness: $SK_{AI}, SK_{RI}$.
  Output: Signed ZKP: $\text{Sign}_{SK_{RI}}(\pi_{AI})$
  Parties: C and I
1  I picks a, a' ← $Z_q$, sets $SK_{RI} = a$, $SK_{AI} = a'$, and $VK_{RI} = g^a$, $VK_{AI} = g^{a'}$.
2  begin
3  | I picks $\omega_1 = g^{a \cdot a'}$ and sends DDH tuple
   | (g, X = $g^a$, Y = $g^{a'}$, Z = $g^{a \cdot a'}$) to C.
4  | C picks a challenge s ← $Z_q$, and sends Com(s) to I, where
   | Com is a Pedersen commitment
5  | I picks $r_1$ ← $Z_q$, computes $y_1 = g^{r_1}$ mod q,
   | $y_2 = g^{a' \cdot r_1}$ mod q. I sends $y_1$, $y_2$ to C.
6  | C sends s to I.
7  | I verifies Com, computes response $z = a \cdot s + r_1$ mod q,
   | and sends (z, $y_1$, $y_2$) to C.
8  | C verifies if $g^z \stackrel{?}{=} (X^s \cdot y_1)$ mod q, and if
   | $Y^z \stackrel{?}{=} (Z^s \cdot y_2)$ mod q. If checks verify, C accepts the
   | response as valid, asks I to send signed transcript of
   | proof, $\pi_{AI}$.
9  | I sends
   | $\sigma_{AI} = \text{Sign}_{SK_{RI}}(\pi_{AI} = H(g||VK_{RI}||VK_{AI}||\omega_1||y_1||y_2||s||z))$
   | to C.
10 end

---

Zero-Knowledge Proofs Between/and C: Protocol 10 is preferably initiated by I when she needs to establish her real identity RI (corresponding to an email address and represented by keypair ($VK_{RI}$, $SK_{RI}$) and tie it to an anonymized identity AI (corresponding to a nickname for the email address and represented by keypair $VK_{AI}$, $SK_{AI}$). I can choose to create a new AI if she needs to change the current AI in case $SK_{AI}$ gets compromised. Protocol 10 preferably enables/to establish her ($VK_{RI}$, $SK_{RI}$), ($VK_{AI}$, $SK_{AI}$) keypairs, and prove in zero-knowledge to C that $VK_{AI}$ could have been generated only by someone who had knowledge of $SK_{AI}$, and that the two key-pairs are related to each other by a DDH tuple. To this end, I and C preferably do a Chaum-Pedersen-style interactive ZKP for I to prove her anonymized identity, AI to C. The proof $\pi_{AI}$ can be made non-interactive by applying the Fiat-Shamir transform. If C chooses to accept the proof as valid, it asks I to send a signed copy of the transcript of the proof, $\sigma_{AI}$. C preferably stores $\pi_{AI}$ and $\sigma_{AI}$.

---

Protocol 11: Setup of ($PI_i$) keypair.

Inputs: Public parameters: Group
  $\mathbb{G}$, $|\mathbb{G}| = q$, g, $h \in \mathbb{G}$, $VK_{AI}, SK_{AI}$.
  Claim: $VK_{PI_i}$ was generated by someone with knowledge of $SK_{AI}, SK_{PI_i}$.
  Witness: $SK_{AI}, SK_{PI_i}$.
  Output: Signed ZKP: $\text{Sign}_{SK_{AI}}(\pi_{PI_i})$.
  Parties: C and I
1  for i ∈ [1..m] do
2  | I picks a'' ← $Z_q$, sets $SK_{PI_i} = a''$, $VK_{PI_i} = g^{a''}$.
3  | begin
4  | | I parses $SK_{AI}$ as a' and $VK_{AI}$ as $g^{a'}$.
5  | | I picks $\omega_2 = g^{a' \cdot a''}$. I sends DDH tuple
   | | (g, zkpVerf = (Y = $g^{a'}$, P = $g^{a''}$, Q = $\omega_2$)) to C.
6  | | C picks a challenge $s_1$ ← $Z_q$, and sends Com($s_1$) to I,
   | | where Com is Pedersen commitment.
7  | | I picks $r_1'$ ← $Z_q$, computes $y_1' = g^{r_1'}$ mod q, and
   | | $y_2' = g^{a'' \cdot r_1'}$ mod q, sends $y_1', y_2'$ to C.
8  | | C sends $s_1$ to I.
9  | | I verified Com, computes response:
   | | $z_1 = a'' \cdot s_1 + r_1'$ mod q, and sends ($z_1, y_1', y_2'$) to C.
10 | | C verifies if $g^{z_1} \stackrel{?}{=} (Y^{s_1} \cdot y_1')$ mod q, and if
   | | $P^{z_1} \stackrel{?}{=} (Q^{s_1} \cdot y_2')$ mod q. If checks verify, C accepts the
   | | response as valid, asks I to send signed transcript of
   | | proof, $\pi_{PI_i}$.
11 | | I sends $\sigma_{PI_i} = \text{Sign}_{SK_{AI}}(\pi_{PI_i} =$
   | | $H(g||VK_{AI}||VK_{AI_i}||\omega_2||y_1'||y_2'||s_1||z_1))$ to C.
12 | end
13 end

---

Protocol 11 is preferably initiated by I when she needs to establish her pseudonymous identity ("PI") keypair $VK_{PI}$, $SK_{PI}$, where i∈[1 . . . m]. I could have multiple PIs tied into a single AI, but preferably only one can be active at a given point in time. I creates a new $PI_{i+1}$ if $SK_{PI_i}$ gets compromised or after a certain time period, which can optionally be a system parameter.

Protocol 11 is preferably used for I to establish her ($VK_{PI_i}$, $SK_{PI_i}$) keypairs, and prove in zero-knowledge to C that $VK_{PI_i}$ could only have been generated by someone who had knowledge of $SK_{AI}$, and the two key-pairs are preferably related to each other by a DDH tuple. To this end, I and C do a Chaum-Pedersen-style IZKP, similar to Protocol 10 for I to prove her current pseudonymous identity, $VK_{PI_i}$ to C (made non-interactive by applying the Fiat-Shamir transform). If C chooses to accept the proof, $PI_i$, as valid, it preferably asks I to send a signed copy $\sigma_{PI_i}$ of the transcript of the proof. C preferably stores $\pi_{PI_i}$ and $\sigma_{PI_i}$. $\pi_{PI_i}$ and $\sigma_{PI_i}$ are preferably used by C during surveillance to prove that $PI_i$ was generated by I. Although embodiments of the present invention preferably abstract it out, a Pedersen commitment is of the form $\beta^v \cdot \omega^r$ (mod q), where $\beta, \omega \in G$, $q=|G|$, v is the value to be committed to, and r is the commitment randomness. Here, $\omega = \beta^a$ mod q, where $a \leftarrow Z_q$ is the receiver of the commitment. $\omega$ is preferably fairly chosen in a distributed manner by I, C.

Note that the ZKP and the signature on the ZKP can be replaced by a single signature zero-knowledge proof of knowledge.

UC Functionalities and Analysis: The notion of UC security is preferably captured by the pair of definitions below:
- Definition (UC-emulation)—Let $\pi$ and $\phi$ be probabilistic polynomial-time ("PPT") protocols. $\pi$ UC-emulates $\phi$ if for any PPT adversary A there exists a PPT adversary S such that for any balanced PPT environment Z we have $EXEC_{\phi,S,Z} \approx EXEC_{\pi,A,Z}$
- Definition (UC-realization)—Let F be an ideal functionality and let $\pi$ be a protocol. $\pi$ UC-realizes F if $\pi$ UC-emulates the ideal protocol for F.

The functionalities of $F_{Surveil}$ are preferably described as: $F_{zk}^{SAMPL}$, $F_{init}$, $F_{create}$, FBC. $F_{Surveil}$ is assumed to maintain a table $\tau$, with information about the individuals being surveilled, and the surveillance orders. A single row of the table would look like: ($VK_{RI}$, SO, soid) where soid denotes the id number of the SO which is associated with $VK_{RI}$. $\perp$ is used to denote unresponsive parties, malformed replies to the ideal functionalities, and ideal functionalities returning fail messages to parties.

Ideal functionality for zero-knowledge proofs $F_{zk}^{SAMPL}$ is preferably defined based on the ideal zero knowledge functionality, $F_{zk}$. In embodiments of the present invention, $F_{zk}^{SAMPL}$ is preferably restricted only to discrete-log relations, and also involves the ideal functionality writing the claim to the shared table $\tau$. $F_{zk}^{SAMPL}$ is given as:

---

Functionality $F_{zk}^{SAMPL}$ $F_{zk}^{SAMPL}$ proceeds as follows, running with prover, verifier C, an adversary S. Let G be a prime-order cyclic group, $\partial \in$ G,
|G| = q, and a $\in Z_q$
(1) Upon receiving ($VK_{RI}$, sid, a) from I, if $\partial^a = VK_{RI}$, send ($VK_{RI}$, sid) to C and S, else exit. Write ($VK_{RI}$) to table $\tau$ and exit.

--- and the $F_{zk}$ functionality is given as:

---

Functionality $F_{zk}$ $F_{zk}$ proceeds as follows, running with a prover P, verifier V, and an adversary S, and parametrized with a relation R:
(1) Upon receiving (zk - prover, sid. x, w) from P, if R(x, w) = 1, send (zk - proof, sid, x) to V and S and exit. Otherwise exit.

---

$F_{zk}^{SAMPL}$ is parametrized by a prime-order cyclic group G, |G|=q, g$\in$G, a$\in Z_q$, and a session id, sid. The prover, I preferably sends a claim to be proven, $VK_{RI}$ to $F_{zk}$, and a witness a. $F_{zk}$ checks if $\partial^a = VK_{RI}$, i.e., if the claim is correct and forwards $VK_{RI}$ to the verifier C and the ideal-world adversary S, and writes $VK_{RI}$ into table $\tau$.

$F_{zk}$ is preferably parametrized by a relation R, and a session id, sid. The prover, P preferably sends a claim to be proven, x to $F_{zk}$, and a witness w. $F_{zk}$ preferably checks if R(x, w)=1, i.e., if the claim is correct and forwards x to the verifier V and the ideal-world adversary S.

The $F_{init}$ preferably uses the following ideal functionality for issuance of SO:

---

Functionality $F_{init}$ (1) L sends $F_{init}$ a tuple requesting for an IO, (create - IO, evidence, $VK_{RI}$), which $F_{init}$ forwards to J. J replies with either (accept, $VK_{RI}$) or $\perp$. If J responds with $\perp$, $F_{init}$ returns $\perp$ to L and exits.
(2) If J accepts the IO request, $F_{init}$ creates an intermediate order IO = ($VK_{RI}$, evidence) and sends it to C. C can either send(accept) or $\perp$ to $F_{init}$. If C sends (accept), $F_{init}$ checks if $VK_{RI}$ is present in table $\tau$. If yes, $F_{init}$ proceeds to the next step. If either C sends $\perp$, or $VK_{RI}$ is not present in $\tau$, $F_{init}$ sends $\perp$ to J, L, C and exits.
(3) $F_{init}$ picks a symmetric key, K $\leftarrow \{0, 1\}^\lambda$, and generates data $\leftarrow \{0, 1\}^\lambda$, creates a surveillance order tuple, SO = (metadata, ( F = $E_K(VK_{RI}$, data)), and picks an soid $\in Z^+$. $F_{init}$ writes (SO, soid) to $\tau$ in the $VK_{RI}$ row. $F_{init}$ sends (K, ĉ) to J, L, C. $F_{init}$ calls $F_{BC}$ and writes SO to the blockchain.
(4) At the time of unsealing of SO, $F_{init}$ sends I a tuple SO = (metadata, $VK_{RI}$, data) and exits.

--- and preferably interacts with J, L, and C and preferably initiates the process for creating a SO, and posts the SO to the BC. L initiates contact with $F_{init}$ by sending a (create—IO, evidence, $VK_{RI}$) request tuple to $F_{init}$. $F_{init}$ forwards the request to J, who can accept or decline it. If J accepts, $F_{init}$ preferably creates an intermediate order IO=($VK_{RI}$, evidence) and forwards the IO to C. C can either accept or decline the IO. If either J or C declines the IO request, $F_{init}$ preferably aborts the execution and exits. If C accepts, $F_{init}$ preferably checks if $VK_{RI}$ was deposited in the shared table $\tau$ by $F_{zk}^{SAMPL}$.

If yes, it means $VK_{RI}$ was verified by $F_{zk}^{SAMPL}$. $F_{init}$ then generates a key K$\leftarrow \{0, 1\}^\lambda$, preferably generates a string regarding the surveillance order, data$\leftarrow \{0, 1\}^\lambda$, which includes evidence provided by L, crimes committed by $VK_{RI}$, reason for sealing, etc. It also preferably generates metadata, which can include the date the SO will be unsealed. $F_{init}$ writes (SO, soid) to the table $\tau$, in the $VK_{RI}$ row. $F_{init}$ then creates the SO tuple: (metadata, C=EK ($VK_{RI}$, data)) sends (K, C) to J, L, C, calls $F_{BC}$ and posts the SO on the BC. Finally, when the SO needs to be unsealed, $F_{init}$ proactively contacts I, whom $VK_{RI}$ belongs to, and gives her the decrypted contents of the SO.

$F_{create}$ is given as:

---

Functionality $F_{create}$ (1) L sends a tuple (create - SR, $VK_{RI}$) to $F_{create}$. $F_{create}$ looks up the SO corresponding to $VK_{RI}$ in $\tau$. If none exists, $F_{create}$ sends $\perp$ to L and exits. Else. $F_{create}$ generates an SR = (SO, $VK_{RI}$) and forwards it to L and C.
(2) C replies to $F_{create}$ with a tuple ($VK_{RI}$, records $\leftarrow \{0, 1\}^\lambda$, where records $\leftarrow \{0, 1\}^\lambda$ denote $VK_{RI}$'s emails, and verification metadata. If C replies with $\perp$. $F_{create}$ will call $F_{BC}$ and write (SO, C) to the BC and exit.
(3) In response to C's tuple, $F_{create}$ verifies records, and creates an SRR = (SO, records) tuple, and forwards to L and C.
(4) $F_{create}$ calls $F_{BC}$, posts H(SR) and H(SRR) to the BC and exits.

---

$F_{create}$ creates a request SR and response SRR. L preferably first contacts $F_{create}$ for creating an SR by sending $VK_{RI}$, upon which $F_{create}$ looks up table τ for an SO corresponding to $VK_{RI}$. If none has been entered by $F_{init}$, that means L is not authorized to surveil $VK_{RI}$, and $F_{create}$ returns ⊥ to L. Else, $F_{create}$ proceeds with generating SR and forwards SR to L and C. At this point, C is expected to respond to SR with $VK_{RI}$'s emails, batch information, and Merkle tree information required to verify the emails are from the correct batches.

All this information is preferably represented by a string, records. If C ignores the request, $F_{create}$ will preferably write C's identity to BC, along with the associated SO (this means C is behaving maliciously). If C responds with the records, $F_{create}$ will preferably first verify that the records belong to the surveillance time-period as given in the metadata part of the SO. If verification succeeds, $F_{create}$ will create the SRR, which will be sent to L and C. Finally, $F_{create}$ preferably posts the hash of SR, SRR to BC respectively.

The blockchain functionality, $F_{BC}$, is given as:

| | Functionality $F_{BC}$ |
|---|---|
| (1) | $F_{BC}$ receives three kinds of write messages: Finit writes SO, $F_{create}$ writes (SO, C) and $F_{create}$ writes (H (SR), H (SRR)). $F_{BC}$ writes the tuples to the blockchain and sends a copy of the newest block B to all parties, J,L,C,I by sending a tuple (update, B). |
| (2) | Each party either replies with (agree, B) or ⊥. In the former case, the party updates the local copy of the blockchain, and is synced with the global blockchain. However if the reply was ⊥, the party now has an outdated copy of the blockchain. |
| (3) | In the event that an outdated. party wants to get synced with the blockchain it sends a message (read) to $F_{BC}$, $F_{BC}$ replies with (update, B'). where B' is the copy of the entireblockchain. |

$F_{BC}$ receives messages from $F_{init}$ and $F_{create}$. $F_{BC}$ writes tuples to the blockchain, and sends a copy of the new block, B, to parties J, L, C, I. This is preferably done by sending (update, B). The party can either accept the update, or decline (unresponsive, disconnected, or non-cooperating parties). When a dormant party wishes to update itself, it can request a copy of the full blockchain by sending a read message to $F_{BC}$.

Correctness: The privacy properties that embodiments of the present invention aim to provide are accountability for L and C, protection against a forgetful J who might forget to unseal orders, and protection against a malicious I and C. Accountability is provided by the fact that $F_{create}$ generates the SR and SRR, thus ensuring that no data is over-requested by L, or over-shared by C, both in terms of redundant data belonging to the same user, or other users' data. $F_{init}$ creates the SO and guarantees that the SO will get unsealed by $F_{init}$ before it exits, thus providing protection against forgetful J. Because $F_{zk}^{SAMPL}$ checks the witness and generates the ZKP for each $VK_{RI}$, it ensures that a user cannot create a fake ZKP for $VK_{RI}$ that passes verification, yet the corresponding $SK_{RI}$ cannot be used for decrypting the user's email records. Protection against a malicious C which tries to include fake data in an SRR is provided by $F_{create}$, which verifies C's returned user information before creating an SRR.

Some configuration choices that are preferably made for an embodiment of the present invention include:

1) In $F_{init}$, J, C can preferably return to $F_{init}$ in Step 1 and Step 2 respectively. This is to model the fact that in the real-world, J has the right to refuse a surveillance request by L, and C has the right to refuse or appeal an intermediate order by J.

2) $F_{init}$ preferably creates an SO, and $F_{create}$ preferably generates the SR and SRR for SO, but only after being contacted by L (Step 1 of $F_{create}$). This is because in the real-world, L might get an SO authorized by J, but may choose not to follow it up with any action, i.e., eventually not conduct any surveillance, e.g., because L needs to invest its limited resources in higher-priority matters, budget cuts after SO was issued, etc.

3) $F_{create}$ preferably writes C's identity to the BC if C doesn't respond with I's email records in Step 2 of $F_{create}$ For example, it may be assumed that I is an (email) customer of C, and C will have email records associated with/for the surveillance period. These emails are preferably stored only with C. If C deliberately chooses not to respond to, or refuses an SR, after having accepted the IO that the SR is a follow up on ($F_{init}$, Step 2), then that can only be construed as malicious behavior on the part of C. Hence $F_{create}$ will expose malicious C's identity on the public BC.

Proof of Theorem 1: An embodiment of the present invention can describe a simulator S such that for any real-world A running with SAMPL, Z cannot distinguish A from an ideal-world S running with $F_{Surveil}$. S runs A internally, simulates all inputs A is expecting, and gives A's outputs to $F_{Surveil}$, who will complete the simulation in the ideal-world. S reflects the choices of A in the ideal-world, and reflects the protocol outcomes and aborts of the ideal-world in the real-world. If A cheats, S aborts.

That is, any attempt by A to cheat in the real-world will result in the protocol aborting in both, the ideal and real worlds. Hence it follows that at no PPT Z can distinguish between $EXEC_{SAMPL}$, A, Z and $EXEC_{F_{Surveil}}$, S, Z. Considering now a complete run of the protocol, starting from when I sets up her RI, AI, π keypairs with C and ending when L receives the validated SRR from a subset of E.

First, S needs to create keypairs ($VK_{RI}$, $SK_{RI}$), ($VK_{AI}$, $SK_{AI}$), ($VK_{PI_j}$, $SK_{PI_j}$), j∈[1 . . . m]. S simulates a UC-secure digital signature scheme, $S_{sig}$, that UC-realizes the ideal digital signature functionality, $F_{sig}$, and creates the keypairs. The $VK_{RI}$, $VK_{AI}$ and $VK_{PI_j}$ will be handed over to A. If A wishes to corrupt I, $VK_{RI}$, $SK_{AI}$ and $SK_{PI_j}$ will also be given to A.

S will also preferably generates the zero-knowledge proofs associated with $VK_{AI}$ and $VK_{PI_j}$. S preferably runs the steps of Protocol 10, computes $\pi_{AI}$=(H (g||$VK_{RI}$||$VK_{AI}$||ω1||y1||y2||s||z)) and generates $\sigma_{AI}$ by calling $S_{sig}$. S then gives $\pi_{AI}$ and $\sigma_{AI}$ to A along with the keys. S follows a similar procedure for generating the $\pi_{PI_j}$, $\sigma_{PI_j}$ of Protocol 11. In the ideal-world, S will call $F_{sig}$ to generate $VK_{RI}$, and call $F_{zk}^{SAMPL}$ for generating the ZKP corresponding to $VK_{RI}$. If A rejects the ZKPs or signatures, S preferably aborts the execution.

S then preferably sets up shared key $K_{CI}$ of Protocol 1, and passes it to A, if A has corrupted either C and/or I. S creates a key K←$\{0, 1\}^λ$ by calling $F_{init}$, and passes it to A. Finally, S generates a random batch-size bSize and gives to A. This completes the simulation of the setup phase.

Next, S needs to pass on inputs to A during the SO creation phase, and simulate the corresponding actions in the ideal-world (actions of Protocol 3). If A has corrupted L, A will generate the SR=($VK_{RI}$, evidence), else, S generates the SR=($VK_{RI}$, evidence) and gives the SR to A (recollect from the adversary model that J is forgetful, but not malicious). In other words, A cannot corrupt J.

Once J (impersonated by S) has received the SR from A, J will validate it, and decide whether to accept it or not. Once J decides, it will give its output to A. A will then pass on the IO to C, through corrupted L. C will decide whether to accept the IO or not. If A has corrupted C, then this communication is handled locally by A, and need not be simulated. If C is honest, its action will be simulated by S.

C responds to the IO, and generates an SRR= $(VK_{AI} \| \pi_{AI} \| \sigma_{AI})$, and sends SRR to J, L. In the ideal world, S calls $F_{init}$, which creates an IO and sends to J, L, C. If A cheats, i.e., includes a wrong $\pi_{AI}$, $\sigma_{AI}$ inside the SRR, then S will send a corresponding malformed message to $F_{init}$, which will then abort (Step 2 of Functionality of $F_{init}$), and S aborts the execution of A. S then generates the SO as an honest J would, and gives the final SO to A. If either of C or L are corrupted by A, or if a subset of E are corrupted by A, S will send the $K_{JLC}$ and/or $K_{EJLC}$ to A. The SO generation by S is straightforward (simulate $S_{sig}$ for signatures, $F_{sig}$ in the ideal-world, etc.). If at any step, the signatures in the SO sent by A do not verify, S preferably aborts. In the ideal-world, S calls $F_{init}$ who will in turn call $F_{BC}$ and posts the SO to the blockchain.

The next step for S is to simulate the storage of I's emails on C (see Protocol 2). There are three cases to consider:
1) Case 0: If both I and C are corrupted by A, this is handled locally by A, and does not need to be simulated.
2) Case 1: If C is corrupted, but I is not, S creates I's outputs, i.e., for each $M_x \in M_{bNum}$, $x \in [1 \ldots bSize]$, S generates a $C_x$. A, playing the role of corrupted C will create a Merkle hash tree with the $H(C_x)$ at the leaves, which will be checked by S, will verify the root-hash and will abort if there is any mismatch. Else, S will sign the root-hashes by simulating $S_{sig}$. In the ideal world, S will get random strings signed by calling $F_{sig}$.
3) Case 2: If/is corrupted, but C is not, A does I's leaf encryptions, creates $C_x$'s, etc., and gives to S. S generates the corresponding root-hashes for the Merkle trees, and sends the root-hashes to A for signing. A is expected to sign the root-hashes. If A refuses to sign the root-hashes, S will abort.

Now, S preferably simulates the creation and verification of the SR (see algorithm 4, and algorithm 5). For this, S will retrieve the SO, t, etc., and construct a tuple SR= $(SO \| t \| VK_{RI} \| C)$ and forward it to a subset of E. If L is corrupted, A will construct the SR tuple. If A's SR tuple is malformed, S preferably aborts. In the ideal world, S calls $F_{create}$, who generates the SR. At this point $S \subseteq E$ needs to validate SR. Per the adversary model, A can corrupt a minority of members in S. Here there are two cases to consider:
1) Case 0: None of S are corrupted: S verifies SR (if SR was generated by A in the previous step), and checks it against the SO S had created. S simulates $S_{sig}$ and creates the signature $Y_{SR}^S$, and gives it to A. In the ideal world, S calls $F_{sig}$ and creates the signature.
2) Case 1: A (minority) subset of S are corrupted by A. For the minority, A will check the SR. If A rejects the SR, or refuses to produce a signature $\sigma_{SR}^S$, for any reason, S preferably aborts, and sends a malformed request to $F_{create}$, which will abort the simulation in the ideal world. Communication among members of corrupted minority of S is controlled by A and need not be simulated. If A behaves properly, i.e., validates the SR and produces signature $\sigma_{SR}^S$, S will simulate the honest majority, and the ideal world similar to Case 0.

S preferably simulates C, producing an SRR, and a subset of E, verifying the SRR. S first retrieves the SO it created. Here again, there are two broad cases:

1) Case 0: If C is uncorrupted, S retrieves the $C_x \in C_{bn}$; $x \in [1 \ldots bSize]$, adds the $C_x$'s, sibling hashes, etc. to the SRR tuple, the ZKP tuple it created before, calls $S_{sig}$, signs the SRR tuple, and gives the H(SRR), along with the signed SRR to A. A then passes it on to $S \subseteq E$, who will accept or reject it. If all members of S are honest, S will validate the signed SRR, thus concluding. In the ideal world, S will call $F_{create}$, $F_{zk}^{SAMPL}$, and $F_{sig}$ to create and sign the SRR, respectively.
2) Case 1: If C is corrupted, A will create the SRR; the SO is given to A. Firstly, A can return a verification fail on the SO created by S. If this happens, S will abort the simulation.

If A chooses to proceed with the simulation, A will create the Merkle hash trees with the $H C_x$ at the leaves, sibling hashes, etc. A will give the ZKPs, $\pi_{AI}$, $\pi_{PI_i}$ and signatures on the ZKPs, $\sigma_{AI}$, $\sigma_{PI_i}$ to S. If any do not verify, S preferably aborts. A will generate the final SRR, and H(SRR). If the SRR is malformed, in the ideal-world, S will cause $F_{create}$ to abort by having C not reply to an SRR. $F_{create}$ will write malicious C's identity to the blockchain by calling $F_{BC}$.

If a minority of $S \subseteq E$ are corrupted, A can return a fail on the ZKP verification, upon which S aborts. If A rejects the SRR, or refuses to produce a signature $\sigma_{SRR}^S$, S preferably aborts. In the ideal world, S will corrupt C such that C does not respond to $F_{create}$'s request for an SRR, upon which $F_{create}$ will write C's identity to the blockchain by calling $F_{BC}$, and will then abort. If A validates the SRR and produces signature $\sigma_{SRR}^S$, S will simulate the honest majority. In the ideal world S will call $F_{sig}$. Lastly, S will give $K_{CI}$ to A, if A had not already corrupted C and/or I, and obtained $K_{CI}$ earlier. This concludes the proof.

Embodiments of the present invention can also be applied to other general data sharing interactions, aside from those specifically discussed in this application. For example, embodiments of the present invention can be used in the interactions of companies that share and sell user data. Currently, without the present invention, there is no way they can validate to the stakeholders the information that they shared to another interested party. Embodiments of the present invention enable such validation. In one embodiment, the enforcer can include a data broker or an independent person or company.

Embodiments of the present invention also allow identification of the parties who have access to the data and the parties to whom a request for deletion and/or modification of the data needs to go, for example under general data protection regulations and/or guidelines. Embodiments of the present invention enable a gatekeeper, conduit, and/or broker to all share interactions to remain anonymous but can provide a witness when needed.

INDUSTRIAL APPLICABILITY

The invention is further illustrated by the following non-limiting examples.

Example 1

The performance of SAMPL was evaluated for scalability, and to bench mark the operations performed by different entities within SAMPL with varying system parameters and surveillance requirements.

Experimental Setup: Four desktop class machines with INTEL® Core™ i7-6700K CPUs and 8 GB RAM each were used to run an implementation of SAMPL according to an embodiment of the present invention. Each of the machines ran a single entity in SAMPL: J, E, L, and C, communicating over C Sockets. The entities were coded using the C programming language and compiled with gcc version 7.3.0 (Ubuntu 7.3.0-27 ubuntu1 18.04). Random user data, for 500 users, was pre-generated and stored in an SQL database (email was used as the representative application) at C. User data was created for 120 days.

In this experiment, RI for a given user was tied to their real name and each user had an AI tied to their name in the database, where the AI was a key pair that was tied to the user's $PI_i$; $i \in [1 \ldots m]$ using ZKPs. The simulation was performed with only a single $PI_i$ for each user's data, during the surveillance period. The cryptographic operations of signing and verifying user data, and ZKP related operations were prototyped using the Charm Cryptographic framework. AES-256 in GCM mode was used for the symmetric key encryption involving $K_{CI}$, $K_{JLC}$, and $K_{EJLC}$. For emulating the blockchain in SAMPL, Ethereum was used. Each entity ran its own Ethereum node and communicated with the local blockchain network.

Metrics and Parameters: Separate simulations were run for 5, 10, 15, and 30 users in the SO posted by J. The surveillance periods simulated were 5, 10, 20, and 50 days. These aforementioned values (number of users, days) are chosen to demonstrate scalability in the event of concurrency. SAMPL was evaluated using the following metrics:
1) ZKP generation and verification time per user: The Prime192v1 Elliptic Curve was used as the prime order group G for ZKP as described in Protocol 11.
2) Merkle root generation and signing per user: Simulations were run for batch-sizes with 16, 32, 64, 128, and 256, leaves in the tree with message sizes set to 1 KB, 75 KB, 1 MB, and 2 MB.
3) Enforcer Verification Time: Measured for 5, 10, 15, and 30 users, batch sizes of 32 and 64 messages, and surveillance period of 5, 10, 20, and 50 days. The message size was set to 75 KB.

Verification of SR by E as depicted in FIG. 1, step 11, is not quantified in the results because it does not involve complex cryptographic operations. This step would incur a low computational cost regardless of the number of AIs and duration of surveillance in SR, as it only involves comparisons and range checks between SR and the corresponding SO on BC.

Results: Table 2 reflects the ZKP verification and generation times per user averaged over 100 runs. The generation time was calculated for the setup in Protocol 1 (only establishment of PI: ref. Protocol 11) The average ZKP generation time was 1.02 ms with a standard deviation of 0.236 ms. This time is expended when an/signs up for a new account with C or whenever I establishes a new PI with C. The verification time is calculated for an E verifying the user data inside SRR (calculated once per SRR). The verification time was found to be 1.066 ms with a standard deviation of 0.096 ms.

Figure 4A:
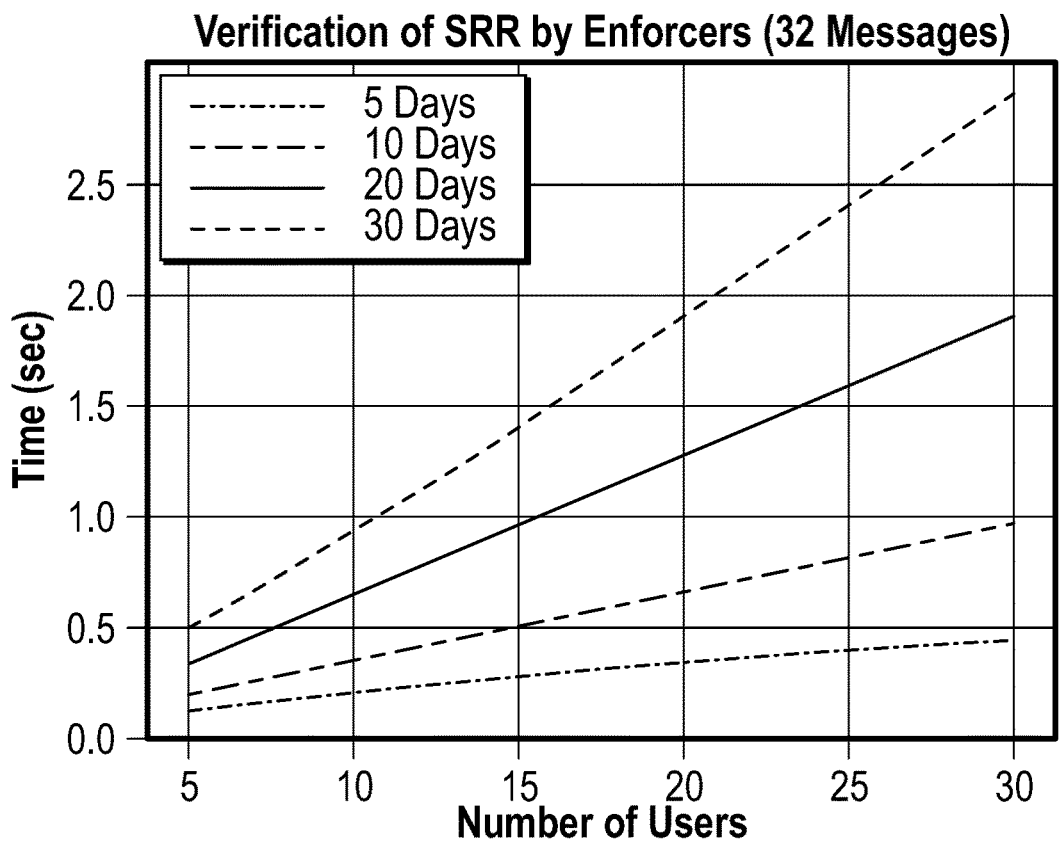
FIG. 4A is a graph which illustrates an example of verification time of SRR by E for different surveillance durations at a batch size of 32 messages.
Figure 4B:
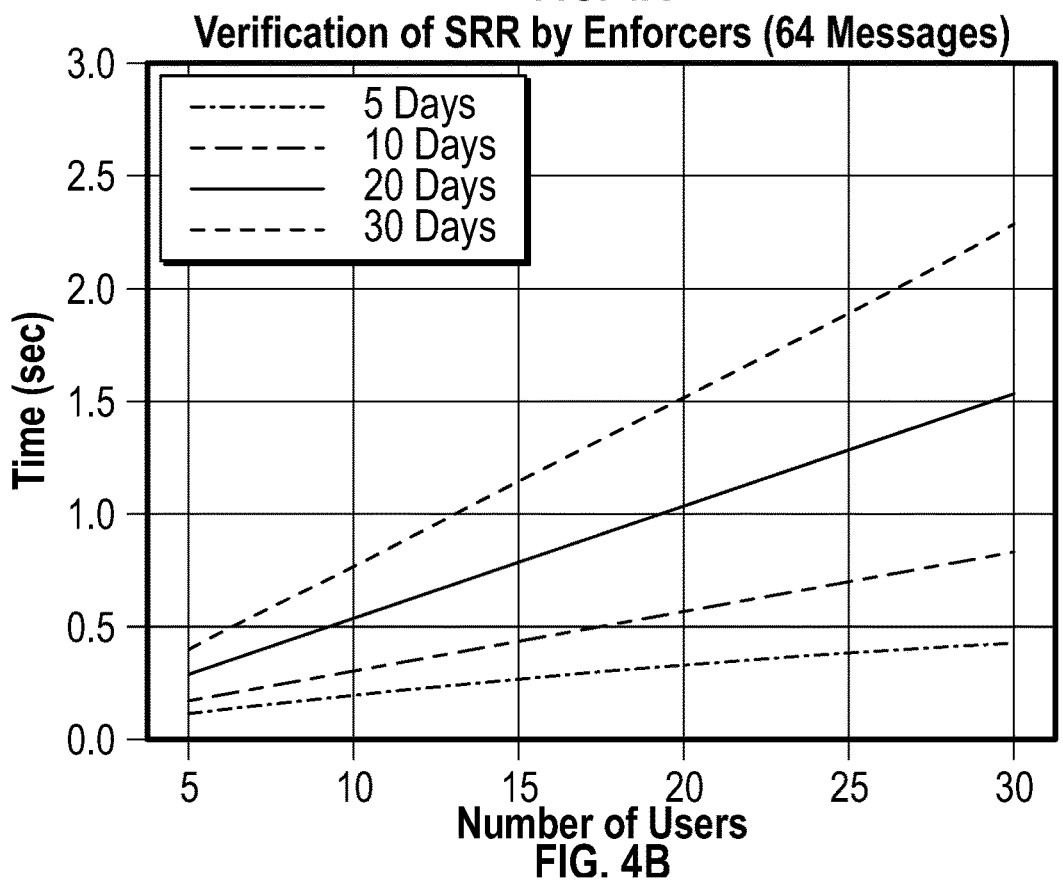
FIG. 4B is a graph which illustrates an example of verification time of SRR by E for different surveillance durations at a batch size of 64 messages.

FIG. 4A illustrates the verification time of SRR by E for different number of I s in SR, and different surveillance periods, for a batch size of 32 messages. FIG. 4B illustrates the SRR verification time, for a batch size of 64 messages. A linear increase in computation time can be observed with an increase in the number of users. The computation time includes the ZKP verifications, the Merkle tree generation and root signature verification (one per user) and performing the date range checks on the data.

Comparison of FIGS. 4A and 4B illustrates that the verification of SRR for batch size of 64 messages is faster by roughly 0.65 s. This difference is because for the same number of total messages, larger batch sizes will result in less Merkle tree roots and signature verification operations when compared to smaller batch sizes. In simulations, SRR verification for 10 users for a surveillance period of 30 days involved processing 299 batches with the batch size of 32 messages, as opposed to 153 batches with 64 messages. Similarly, number of batches processed for 30 users over 30 days involved processing 898 batches with 32 messages and 460 batches with 64 messages.

Figure 4C:
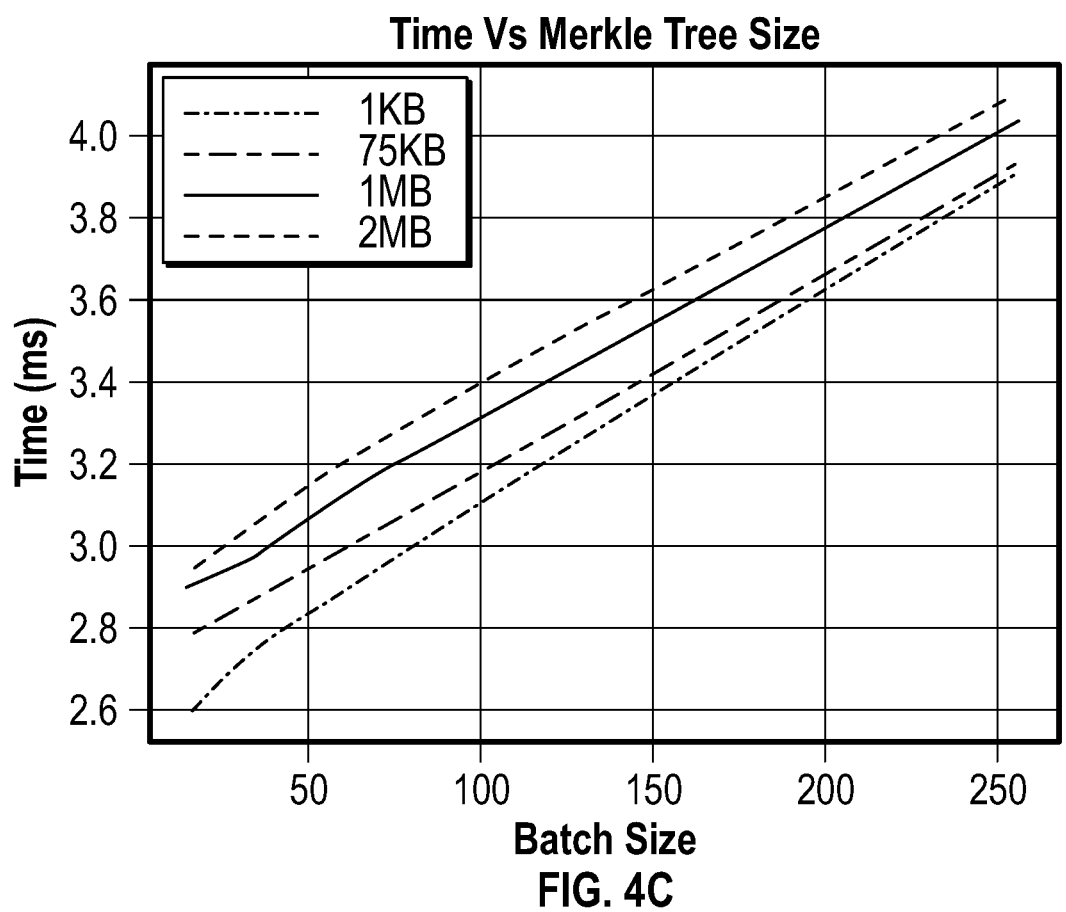
FIG. 4C is a graph which illustrates an example of Merkle tree computation time for different message sizes and batch size.

FIG. 4C illustrates the computation time at C at the end of each batch. Batch sizes of 16, 32, 64, 128, and 256 messages were simulated for messages sizes of 1 KB, 75 KB, 1 MB, and 2 MB, averaged over 50 runs. The larger message sizes represent emails with attachments. The computation time for the different message sizes converges as the batch size grows. This is because once the hashes of the messages are calculated for leaves of the Merkle tree, the rest of the operations on Merkle trees of given batch size are the same for messages of different sizes. For Merkle trees with larger messages, initial hash computation of the leaves of the tree has to deal with larger data size.

To give a fine-grained analysis of components of SRR verification at E, a breakdown of the computation time is given in Table 3. For each step, it does follow that the amount of time taken is linear, as the number of users and/or surveillance period is increased, hence showing the scalability that is offered by embodiments of the present invention.

TABLE 2

| Operation | Mean | Standard Deviation |
| --- | --- | --- |
| ZKP Generation | 1.02 ms | 0.236 ms |
| ZKP Verification | 1.066 ms | 0.096 ms |

Note that the total time for operations performed on a given SRR depicted in Table 3 are lower than the computation time illustrated in FIG. 4A. This is due to the extra operations for look ups and other input-output operations performed by E on SRR during the verification.

The preceding example can be repeated with similar success by substituting the generically or specifically described operating conditions of embodiments of the present invention for those used in the preceding examples.

Optionally, embodiments of the present invention can include a general or specific purpose computer or distributed system programmed with computer software implementing steps described above, which computer software may be in any appropriate computer language, including but not limited to C++, FORTRAN, BASIC, Java, Python, Linux, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. One or more processors and/or microcontrollers can operate via instructions of the computer code and the software is preferably stored on one or more tangible non-transitive memory-storage devices.

Note that in the specification and claims, "about" or "approximately" means within twenty percent (20%) of the numerical amount cited. All computer software disclosed herein may be embodied on any non-transitory computer-readable medium (including combinations of mediums), including without limitation CD-ROMs, DVD-ROMs, hard drives (local or network storage device), USB keys, other removable drives, ROM, and firmware.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguring their relationships with one another.

What is claimed is:

1. A method for ensuring compliance and accountability between parties of a transaction implemented by a hardware processor and memory comprising:
    entering encrypted indicia into a ledger wherein entering is based on an authorization from an individual and the indicia comprises a scope of the authorization for data held by a data holder;
    receiving, from a requesting party, a request for the data;
    the data holder providing encrypted data in response to the request for the data, wherein hashes of individual pieces of the encrypted data are stored at each leaf of one or more Merkle tree, and wherein each root of the one or more Merkle tree is signed by a single data owner with a transient signing key; and
    a part of the authorization for data accessible to the enforcer includes a verification key that is used by the enforcer to determine whether the provided data is within a scope of the authorization without decrypting the encrypted data and forwarding the encrypted data to the requesting party if the encrypted data does not exceed the scope of the authorization.

2. The method of claim 1 wherein the request for data comprises a surveillance order.

3. The method of claim 1 wherein entering encrypted indicia into a ledger comprises entering encrypted indicia onto a blockchain.

4. The method of claim 1 wherein the enforcer enters information into the ledger when the requesting party requests data beyond the scope of the authorization.

5. The method of claim 1 wherein the enforcer enters information into the ledger when the data holder provides data beyond the scope of the authorization.

6. The method of claim 1 further comprising the data holder providing the requesting party with a key for decrypting the encrypted data.

7. The method of claim 1 wherein the authorization comprises a search order in accordance with a national security letter.

8. The method of claim 7 wherein the search order is posted to the public ledger by the requesting party.

9. The method of claim 1 wherein the authorization comprises a request for confidential information.

10. The method of claim 1 wherein receiving, from a requesting party, a request for the data comprises receiving, from a requesting party, a request for IP addresses.

11. The method of claim 1 wherein receiving, from a requesting party, a request for the data comprises receiving, from a requesting party, a request for searchable encrypted data.

12. The method of claim 1 wherein receiving, from a requesting party, a request for the data comprises receiving, from a requesting party, a request for emails.

13. The method of claim 12 wherein the emails are grouped and encrypted into batches of emails.

14. The method of claim 13 further comprising signing with the signing key to preserve privacy of the data owner and wherein a corresponding verification key is tied to a real identity known only to the data owner and the requesting party.

15. A method for ensuring compliance and accountability between parties of a transaction implemented by a hardware processor and memory comprising:
    entering encrypted indicia into a ledger wherein entering is based on an authorization from an individual or an agency and the indicia comprises a scope of requested data held by a data holder;
    receiving, from a requesting party, a request for the data;
    the data holder providing encrypted data in response to the request for the data;
    storing hashes of individual pieces of the encrypted data at each leaf of one or more Merkle Tree, wherein each root of the one or more Merkle tree is signed by a single data owner with a transient signing key; and
    a part of the authorization for data accessible to the enforcer includes a verification key that is used by the enforcer to determine whether the provided data is within a scope of the authorization without decrypting the encrypted data and forwarding the encrypted data to the requesting party if the encrypted data does not exceed the scope of the authorization.

16. The method of claim 15 wherein the scope of requested data comprises a data request as described in a national security letter.

17. The method of claim 15 wherein the scope of the authorization comprises a scope as approved by the United States Congress.

18. The method of claim 17 wherein the scope of the authorization comprises a scope as described in Section 505 of United States of America Patriot Act.

19. The method of claim 15 wherein the agency comprises the Federal Bureau of Investigation.

20. The method of claim 15 wherein the individual comprises an employee of the Federal Bureau of Investigation.

* * * * *